US012761413B2

(12) United States Patent
Hong et al.

(10) Patent No.: US 12,761,413 B2
(45) Date of Patent: Oct. 13, 2026

(54) OPTICAL FILM AND DISPLAY DEVICE INCLUDING THE SAME

(71) Applicant: SAMSUNG DISPLAY CO., LTD., Yongin-si (KR)

(72) Inventors: Hyo Sung Hong, Hwaseong-si (KR); Beong Hun Beon, Hwaseong-si (KR); Duk Jin Lee, Suwon-si (KR); Woo Suk Jung, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 840 days.

(21) Appl. No.: 17/645,388

(22) Filed: Dec. 21, 2021

(65) Prior Publication Data

US 2022/0236470 A1 Jul. 28, 2022

(30) Foreign Application Priority Data

Jan. 27, 2021 (KR) ........................ 10-2021-0011380

(51) Int. Cl.
*G02B 5/30* (2006.01)

(52) U.S. Cl.
CPC ........... *G02B 5/3083* (2013.01); *G02B 5/305* (2013.01)

(58) Field of Classification Search
CPC .............................. G02B 5/3083; G02B 5/305
USPC .......................................................... 359/489
See application file for complete search history.

(56) References Cited

U.S. PATENT DOCUMENTS 9,417,480 B2 * 8/2016 Sato .................. G02F 1/133636
9,523,794 B2 12/2016 Kaneko et al.
10,437,106 B2 10/2019 Sakai et al.
11,022,845 B2 6/2021 Shin et al.
11,152,599 B2 10/2021 Jung et al.
11,276,844 B2 3/2022 Kim et al.
12,204,193 B1 * 1/2025 Terashita .......... G02F 1/134372
2007/0200987 A1 * 8/2007 Yoda ................... G02F 1/13363 349/119
2015/0131031 A1 * 5/2015 Kim ..................... G02B 5/3083 428/1.2
2015/0219814 A1 * 8/2015 Qin .......................... G02B 1/14 359/489.02
2016/0033684 A1 * 2/2016 Kaneko ..................... C08L 1/26 252/582
2016/0077267 A1 * 3/2016 Inagaki ................ G02B 5/3033 359/489.07

(Continued)

FOREIGN PATENT DOCUMENTS

JP 2003-35820 2/2003
JP 2006-251439 A2 9/2006

(Continued)

*Primary Examiner* — Pinping Sun
*Assistant Examiner* — Andrew R Wright
(74) *Attorney, Agent, or Firm* — F. CHAU & ASSOCIATES, LLC

(57) ABSTRACT

An optical film comprises a polarizing layer, a first optical compensation layer that is disposed under the polarizing layer and is a biaxial plate, a second optical compensation layer that is disposed under the first optical compensation layer and is a quarter wave plate, and a third optical compensation layer that is disposed under the second optical compensation layer and is a positive C plate. The first optical compensation layer has an optical axis angle of 86 to 94 degrees with respect to a transmission axis of the polarizing layer.

13 Claims, 25 Drawing Sheets

(56) References Cited

U.S. PATENT DOCUMENTS

| | | | | |
|---|---|---|---|---|
| 2017/0047555 | A1* | 2/2017 | Ishiguro | B32B 7/12 |
| 2017/0343713 | A1* | 11/2017 | Lee | G02B 5/3083 |
| 2018/0003860 | A1* | 1/2018 | Cho | G02B 5/3016 |
| 2018/0231844 | A1* | 8/2018 | Sakai | G02F 1/13363 |
| 2019/0237515 | A1 | 8/2019 | Jung et al. | |
| 2020/0266368 | A1 | 8/2020 | Park et al. | |
| 2020/0313121 | A1* | 10/2020 | Kuo | H10K 59/12 |
| 2020/0326573 | A1* | 10/2020 | Shin | G02F 1/1337 |
| 2021/0005848 | A1 | 1/2021 | Kim et al. | |

FOREIGN PATENT DOCUMENTS

| | | | | | |
|---|---|---|---|---|---|
| JP | WO2014136529 | | | 9/2014 | |
| JP | 2019-101269 | A2 | | 6/2019 | |
| JP | 2019101429 | A | * | 6/2019 | |
| JP | 2019-530014 | A2 | | 10/2019 | |
| JP | 2019-532338 | A2 | | 11/2019 | |
| JP | 2020-076946 | A2 | | 5/2020 | |
| JP | 2020-076947 | A2 | | 5/2020 | |
| JP | 2021-501366 | A2 | | 1/2021 | |
| KR | 10-2012-0055129 | | | 5/2012 | |
| KR | 10-2013-0016135 | | | 2/2013 | |
| KR | 10-2013-0017074 | | | 2/2013 | |
| KR | 10-2018-0042132 | A | | 4/2018 | |
| KR | 10-2019-0120928 | | | 10/2019 | |
| WO | WO2017022623 | A1 | | 2/2017 | |
| WO | WO-2020080197 | A1 | * | 4/2020 | G02B 5/30 |

* cited by examiner

OPTICAL FILM AND DISPLAY DEVICE INCLUDING THE SAME

CROSS-REFERENCE TO RELATED APPLICATION

This application claims priority under 35 U.S.C. 119 from Korean Patent Application No. 10-2021-0011380, filed on Jan. 27, 2021 in the Korean Intellectual Property Office, the contents of which are herein incorporated by reference in their entirety.

BACKGROUND

1. Technical Field

Embodiments of the present disclosure are directed to an optical film and a display device that includes the same.

2. Discussion of the Related Art

The importance of display devices has steadily increased with the development of multimedia technology. Accordingly, various types of display devices, such as a liquid crystal display (LCD) device, an organic light emitting display (OLED) device, etc., have been developed. Such display devices have been incorporated to various mobile electronic devices, such as portable electronic devices such as a smart phone, a smart watch, or a tablet PC, etc.

The display quality of a display device may deteriorate due to incident light that is reflected from the display device. To address this situation, studies have been conducted to reduce reflection of external light by providing an optical film on a display surface of a display device.

SUMMARY

Embodiments of the present disclosure provide an optical film that can reduce light leakage by reducing reflectance of light at a side, and a display device including the same.

In accordance with an optical film according to embodiments, light leakage can be reduced by reducing the reflectance of light at a side, and by providing a first optical compensation layer that compensates for distortion of an optical axis when viewed from the side.

Further, in accordance with a display device according to embodiments, it is possible to enhance display quality by reducing light leakage.

According to an embodiment of the disclosure, an optical film comprises a polarizing layer, a first optical compensation layer that is disposed under the polarizing layer and is a biaxial plate, a second optical compensation layer that is disposed under the first optical compensation layer and is a quarter wave plate, and a third optical compensation layer that is disposed under the second optical compensation layer and is a positive C plate. The first optical compensation layer has an optical axis angle of 86 to 94 degrees with respect to a transmission axis of the polarizing layer.

In an embodiment, the first optical compensation layer has an in-plane retardation value (Ro) from 170 nm to 270 nm.

In an embodiment, the first optical compensation layer has a refractive index ratio (Nz) from 0.5 to 2.5.

In an embodiment, the first optical compensation layer has a retardation value (Rth) from 4 nm to 84 nm in a thickness direction.

In an embodiment, the transmission axis of the polarizing layer is at 0 degrees and an optical axis of the second optical compensation layer is at 45 degrees.

In an embodiment, the optical film further comprises at least one of a first protective member disposed on the polarizing layer or a second protective member disposed between the polarizing layer and the first optical compensation layer.

In an embodiment, the optical film further comprises a first adhesive member disposed between the first optical compensation layer and the second optical compensation layer, and a second adhesive member disposed between the second optical compensation layer and the third optical compensation layer.

In an embodiment, the second optical compensation layer is in contact with a bottom surface of the first optical compensation layer.

In an embodiment, the first optical compensation layer is in contact with a bottom surface of the polarizing layer.

According to an embodiment of the disclosure, a display device comprises a display panel, and an optical film disposed on the display panel. The optical film includes a polarizing layer, a first optical compensation layer that is disposed under the polarizing layer and is a biaxial plate, a second optical compensation layer that is disposed under the first optical compensation layer and is a quarter wave plate, and a third optical compensation layer that is disposed under the second optical compensation layer and is a positive C plate. The first optical compensation layer has an optical axis angle of 86 to 94 degrees with respect to a transmission axis of the polarizing layer.

In an embodiment, the third optical compensation layer is closer to the display panel than the polarizing layer, and is in contact with the display panel.

In an embodiment, the display device further comprises a cover window disposed in front of the optical film, a polymer film layer disposed behind the display panel, and a cushion layer disposed behind the polymer film layer.

In an embodiment, the first optical compensation layer has an in-plane retardation value (Ro) from 170 nm to 270 nm.

In an embodiment, the first optical compensation layer has a refractive index ratio (Nz) from 0.5 to 2.5.

In an embodiment, the first optical compensation layer has a retardation value (Rth) from 4 nm to 84 nm in a thickness direction.

In an embodiment, the transmission axis of the polarizing layer is at 0 degrees and an optical axis of the second optical compensation layer is at 45 degrees.

In an embodiment, the display device further comprises at least one of a first protective member disposed on the polarizing layer or a second protective member disposed between the polarizing layer and the first optical compensation layer.

In an embodiment, the display device further comprises a first adhesive member disposed between the first optical compensation layer and the second optical compensation layer, and a second adhesive member disposed between the second optical compensation layer and the third optical compensation layer.

In an embodiment, the second optical compensation layer is in contact with a bottom surface of the first optical compensation layer.

According to an embodiment of the disclosure, an optical film comprises a polarizing layer; a first optical compensation layer that is disposed under the polarizing layer and is a biaxial plate; a second optical compensation layer that is disposed under the first optical compensation layer and is a quarter wave plate; and a third optical compensation layer that is disposed under the second optical compensation layer and is a positive C plate. The first optical compensation layer has an in-plane retardation value (Ro) from 170 nm to 270 nm, the first optical compensation layer has a refractive index ratio (Nz) from 0.5 to 2.5, and the first optical compensation layer has a retardation value (Rth) from 4 nm to 84 nm in a thickness direction.

DETAILED DESCRIPTION OF EMBODIMENTS

Embodiments of the present disclosure will now be described more fully hereinafter with reference to the accompanying drawings, in which embodiments of the disclosure are shown. This disclosure may, however, be embodied in different forms and should not be construed as limited to embodiments set forth herein.

It will also be understood that when a layer is referred to as being "on" another layer or substrate, it can be directly on the other layer or substrate, or intervening layers may also be present. The same reference numbers may indicate the same components throughout the specification.

Hereinafter, embodiments will be described in detail with reference to the accompanying drawings.

Figure 1:
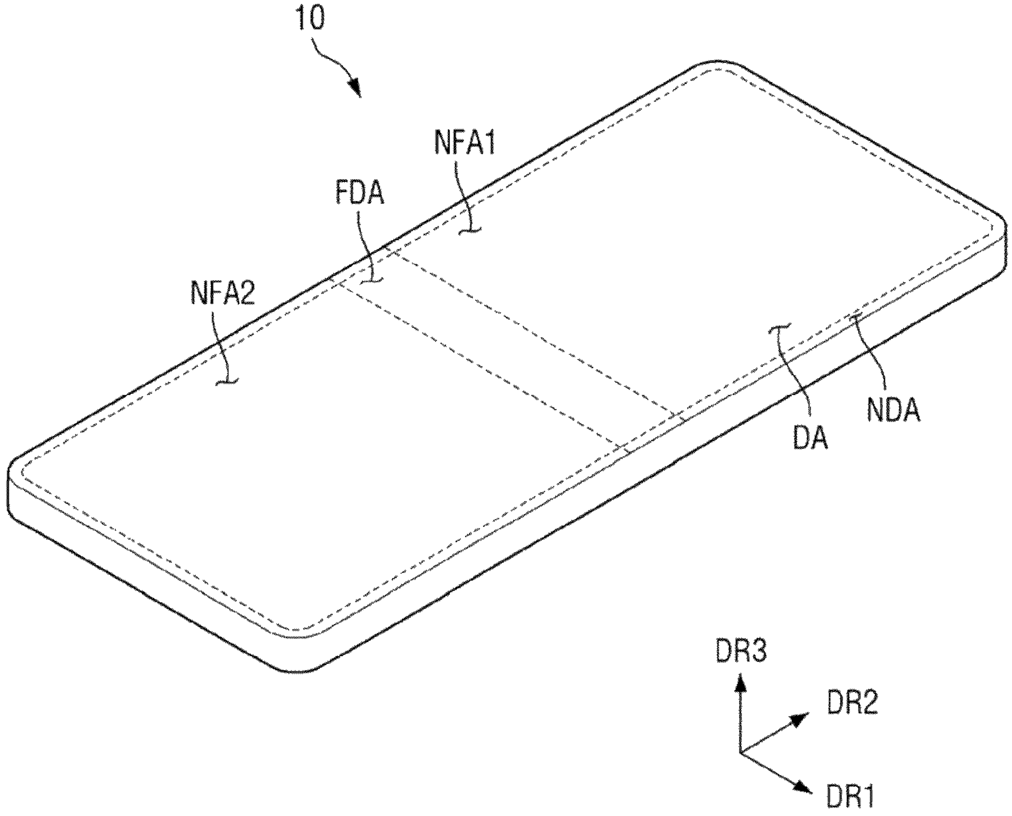
FIG. 1 is a perspective view of a display device in an unfolded state according to an embodiment.
Figure 2:
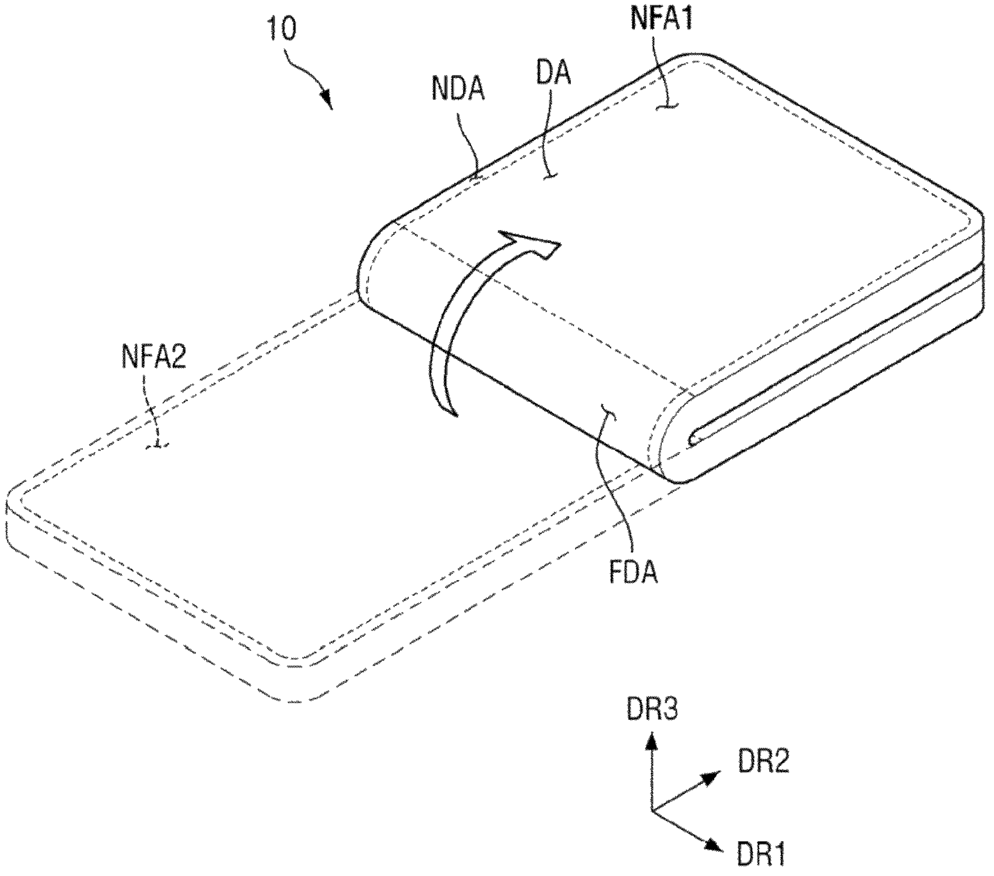
FIG. 2 is a perspective view of a display device in a folded state according to an embodiment.

FIG. 1 is a perspective view of a display device in an unfolded state according to an embodiment. FIG. 2 is a perspective view of a display device in a folded state according to an embodiment.

Referring to FIG. 1, a display device 10 according to an embodiment can be incorporated into a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a car's dashboard, a digital camera, a camcorder, an external billboard, an electronic billboard, a medical device, an inspection device, various household appliances such as a refrigerator or a washing machine, or an Internet-of-Things device.

Further, the display device 10 according to an embodiment can be a foldable display device. For purposes of exposition, it will be assumed that the display device 10 is incorporated into a smartphone, but embodiments are not limited thereto.

In FIGS. 1 and 2, a first direction DR1 is a direction parallel to one side of the display device 10 in a plan view and may be, for example, a horizontal direction of the display device 10. A second direction DR2 is a direction parallel to a side in contact with the one side of the display device 1 in a plan view, and may be, for example, a vertical direction of the display device 10. A third direction DR3 is a thickness direction of the display device 10 and is normal to plane defined by the first direction DR1 and the second direction DR2.

In an embodiment, the display device 10 has a rectangular shape in a plan view. The display device 10 has a rectangular shape with right-angled or rounded corners in a plan view. The display device 10 includes two short sides parallel to the first direction DR1 and two long sides parallel to the second direction DR2, in a plan view.

In an embodiment, the display device 10 includes a display area DA and a non-display area NDA. In a plan view, the shape of the display area DA corresponds to the shape of the display device 10. For example, when the display device 10 has a rectangular shape in a plan view, the display area DA also has a rectangular shape.

In an embodiment, the display area DA includes a plurality of pixels that display an image. The plurality of pixels are arranged in a matrix. Each of the plurality of pixels may have a rectangular, rhombic, or a square shape in a plan view, but embodiments are not limited thereto. For example, in other embodiments, each of the plurality of pixels may have a quadrilateral shape other than a rectangular, rhombic, or square shape, a polygonal shape other than a quadrilateral shape, a circular shape, or an elliptical shape.

In an embodiment, the non-display area NDA does not include pixels and does not display an image. The non-display area NDA is disposed around the display area DA. The non-display area NDA surrounds the display area DA as shown in FIGS. 1 and 2, but embodiments are not limited thereto. In other embodiments, the display area DA is partially surrounded by the non-display area NDA.

In an embodiment, the display device 10 can maintain both a folded state and an unfolded state. As shown in FIG. 2, the display device 10 can be folded in an in-folding manner in which the display area DA is disposed on the inside thereof. When the display device 10 is in-folded, the top surfaces of the display device 10 face each other. Alternatively, for another example, the display device 10 can be folded in an out-folding manner in which the display area DA is disposed on the outside thereof. When the display device 10 is out-folded, the bottom surfaces of the display device 10 face each other.

In an embodiment, the display device 10 is a foldable device. As used herein, the term "foldable device" refers to a device which can be folded and is used to mean not only a folded device but also a device that can have both a folded state and an unfolded state. Further, the folding typically includes folding at an angle of about 180 degrees. However, embodiments of the present disclosure are not limited thereto, and in other embodiments, the folding angle may exceed 180 degrees or be less than 180 degrees. For example, the folding angle may be equal to or greater than 90 degrees and less than 180 degrees, or the folding angle may be equal to or greater than 120 degrees and less than 180 degrees. In addition, a folded state also includes when folding is performed out of an unfolded state, even if complete folding is not performed. For example, even if the device is folded at an angle of 90 degrees or less, as long as the maximum folding angle is 90 degrees or more, the device is considered as being in a folded state to distinguish from the unfolded state. During folding, the radius of curvature may be 5 mm or less, may be in the range of 1 mm to 2 mm, or may be about 1.5 mm, but embodiments are not limited thereto.

In an embodiment, the display device 10 includes a foldable area FDA, a first non-foldable area NFA1, and a second non-foldable area NFA2. The foldable area FDA is where the display device 10 is folded, and the first and second non-foldable areas NFA1 and NFA2 are where the display device 10 is not folded.

In an embodiment, the first non-foldable area NFA1 is disposed on one side, such as an upper side, of the foldable area FDA. The second non-foldable area NFA2 is disposed on the other side, such as a lower side, of the foldable area FDA. The foldable area FDA can be bent to a predetermined curvature.

In an embodiment, the foldable area FDA of the display device 10 is located at a specific location. One or two or more foldable areas FDA can be located at a specific location(s) in the display device 10. In another embodiment, the location of the foldable area FDA is not specified in the display device 10 and can be freely set in various areas.

In an embodiment, the display device 10 can be folded in the second direction DR2. Accordingly, the length of the display device 10 in the second direction DR2 is reduced by approximately half, so that a user can conveniently carry the display device 10.

In an embodiment, the direction in which the display device 10 is folded is not limited to the second direction DR2. For example, the display device 10 can be folded in the first direction DR1. In this case, the length of the display device 10 in the first direction DR1 is reduced by approximately half.

FIGS. 1 and 2 illustrate that each of the display area DA and the non-display area NDA overlaps the foldable area FDA, the first non-foldable area NFA1, and the second non-foldable area NFA2, but embodiments of the present disclosure are not limited thereto. For example, each of the display area DA and the non-display area NDA overlaps at least one of the foldable area FDA, the first non-foldable area NFA1, and the second non-foldable area NFA2.

Figure 3:
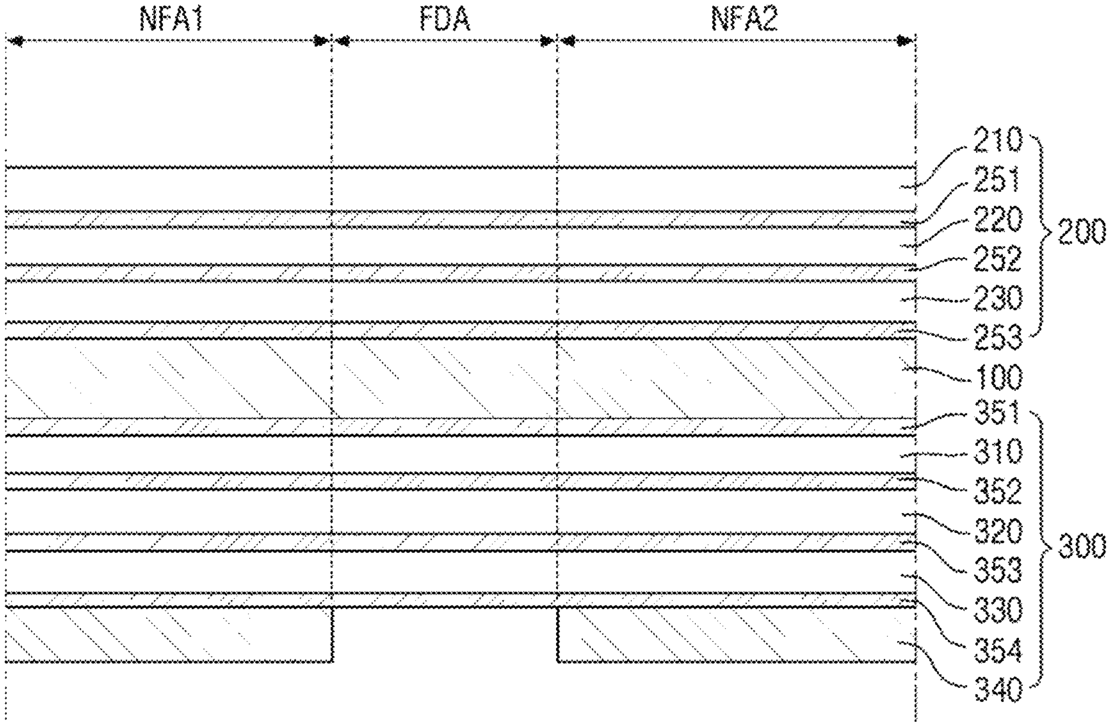
FIG. 3 is a cross-sectional view of a display device in an unfolded state according to an embodiment.
Figure 4:
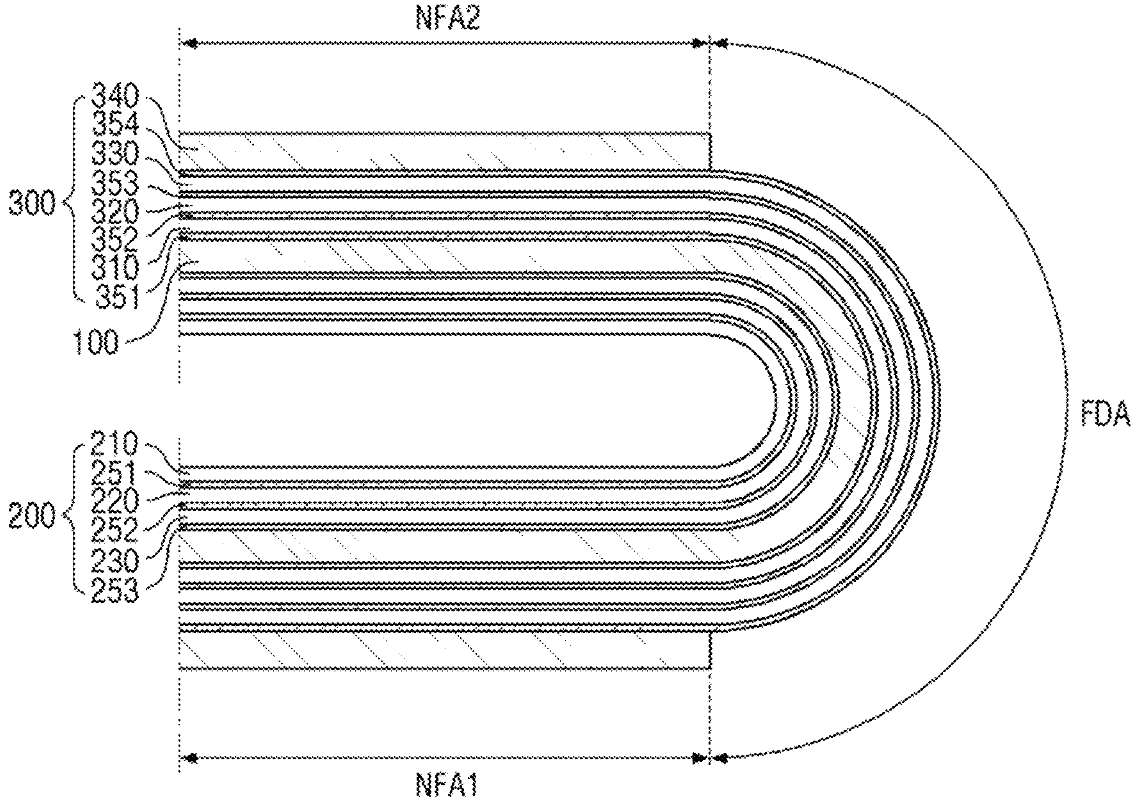
FIG. 4 is a cross-sectional view of a display device in a folded state according to one embodiment.

FIG. 3 is a cross-sectional view of a display device in an unfolded state according to an embodiment. FIG. 4 is a cross-sectional view of a display device in a folded state according to an embodiment.

Referring to FIGS. 3 and 4, in an embodiment, the display device 10 includes a display panel 100, a front laminated structure 200 on a front side of the display panel 100, and a rear laminated structure 300 on a rear side of the display panel 100. The laminated structures 200 and 300 include at least one bonding member 251 to 253 and 351 to 354, respectively. Here, the front side of the display panel 100 refers to a side in which the display panel 100 displays an image, and the rear side refers to a side that is opposite to the front side. One surface of the display panel 100 is located on the front side, and the other surface of the display panel 100 is located on the rear side.

In an embodiment, the display panel 100 displays an image. Examples of the display panel 100 include not only a self-light emitting display panel such as an organic light emitting display (OLED) panel, an inorganic electroluminescence (EL) display panel, a quantum dot light emitting display (QED) panel, a micro-LED display panel, a nano-LED display panel, a plasma display panel (PDP), a field emission display (FED) panel or a cathode ray tube (CRT) display panel, but also a light receiving display panel such as a liquid crystal display (LCD) panel or an electrophoretic display (EPD) panel. Hereinafter, for simplicity of exposition, an organic light emitting display panel will be described as an example of the display panel 100, and an organic light emitting display panel incorporated into an embodiment will be simply referred to as the display panel 100, unless a special distinction is required. However, embodiments are not limited to an organic light emitting display panel, and other embodiments incorporate other display panels mentioned above or known in the art and within the same scope of technical spirit.

In an embodiment, the display panel 100 further includes a touch member. The touch member is provided as a panel or film separate from the display panel 100 and attached onto the display panel 100, but may also be provided in the form of a touch layer inside the display panel 100. For simplicity of exposition, an embodiment in which a touch member is provided inside the display panel 100 and included in the display panel 100 will be described, but embodiments of the present disclosure are not limited thereto.

Figure 5:
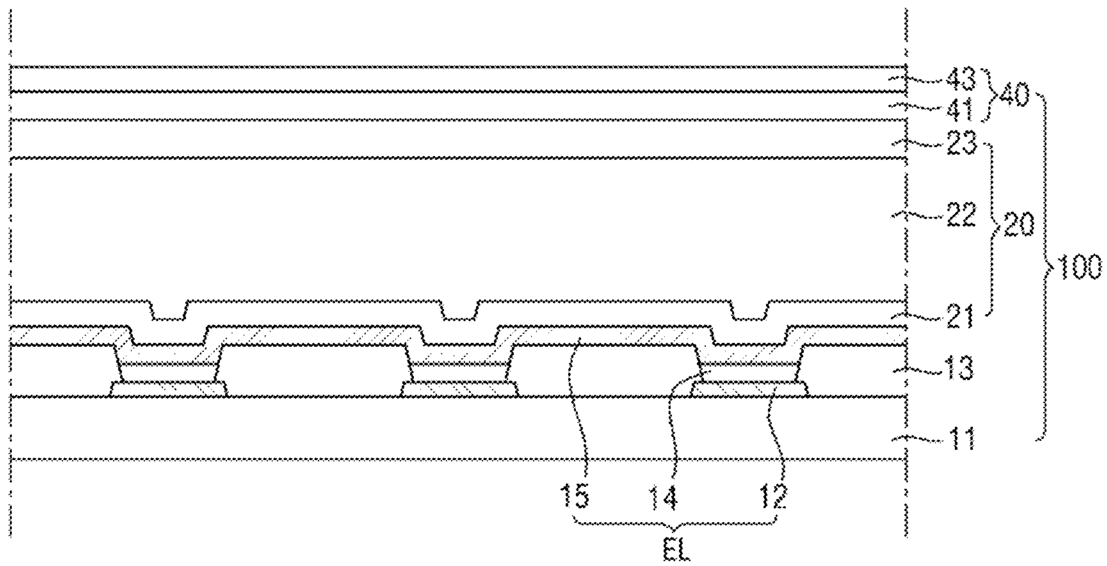
FIG. 5 is a cross-sectional view of a display panel according to an embodiment.

FIG. 5 is a cross-sectional view of a display panel according to an embodiment.

Referring to FIG. 5, in an embodiment, the display device 10 includes the display panel 100. The display panel 100 includes a base substrate 11, a first electrode 12, a pixel defining layer 13, a light emitting layer 14, a second electrode 15, an encapsulation layer 20 and a touch sensor 40.

In an embodiment, the base substrate 11 is an insulating substrate. The base substrate 11 is flexible, and includes a flexible polymer material. The polymer material may be one or more of polyimide (PI), polyethersulphone (PES), polyacrylate (PA), polyarylate (PAR), polyetherimide (PEI), polyethylenenaphthalate (PEN), polyethyleneterephthalate (PET), polyphenylenesulfide (PPS), polyallylate, polycarbonate (PC), cellulosetriacetate (CAT), or cellulose acetate propionate (CAP), or a combination thereof.

In an embodiment, the first electrode 12 is disposed on the base substrate 11. In an embodiment, the first electrode 12 is an anode electrode. In addition, a plurality of components can be further disposed between the base substrate 11 and the first electrode 12. The plurality of components can include, for example, a buffer layer, a plurality of conductive wires, an insulating layer, and a plurality of thin film transistors.

In an embodiment, the pixel defining layer 13 is disposed on the first electrode 12. The pixel defining layer 13 includes an opening that exposes at least a portion of the first electrode 12.

In an embodiment, the light emitting layer 14 is disposed on the first electrode 12. The light emitting layer 14 is disposed in the opening of the pixel defining layer 13. In one embodiment, the light emitting layer 14 emits one of red light, green light, or blue light. The wavelength of red light is about 620 nm to 750 nm, and the wavelength of green light is about 495 nm to 570 nm. Further, the wavelength of blue light is about 450 nm to 495 nm. The light emitting layer 14 is formed of a single layer. Alternatively, in other embodiments, the light emitting layer 14 includes a plurality of organic light emitting layers that are laminated together, such as a tandem structure. In other embodiments, the light emitting layer 14 emits white light. When the light emitting layer 14 emits white light, the light emitting layer 14 includes a red organic light emitting layer, a green organic light emitting layer, and a blue organic light emitting layer that are laminated together.

In an embodiment, the second electrode 15 is disposed on the light emitting layer 14 and the pixel defining layer 13. The second electrode 15 entirely formed on the light emitting layer 14 and the pixel defining layer 13. In some embodiments, the second electrode 15 is a cathode electrode.

In an embodiment, the first electrode 12, the second electrode 15, and the light emitting layer 14 constitute a light emitting element EL.

In an embodiment, the encapsulation layer 20 is positioned on the light emitting element EL. The encapsulation layer 20 seals the light emitting element EL and prevents external moisture, etc., from entering the light emitting element EL.

In an embodiment, the encapsulation layer 20 is a thin film encapsulation film, and includes one or more organic films and one or more inorganic films. For example, the encapsulation layer 20 includes a first inorganic film 21 positioned on the second electrode 15, an organic film 22 positioned on the first inorganic film 21, and a second inorganic film 23 positioned on the organic film 22.

In an embodiment, the first inorganic film 21 prevents moisture or oxygen, etc., from infiltrating into the light emitting element EL. The first inorganic film 21 includes one or more of silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride (SiON), etc.

In an embodiment, the organic film 22 is positioned on the first inorganic film 21. The organic film 22 improves flatness. The organic film 22 is formed of a liquid organic material, such as an acrylic resin, a methacrylic resin, polyisoprene, a vinyl resin, an epoxy resin, a urethane resin, a cellulose resin or a perylene resin, etc. The organic material is disposed on the base substrate 11 through vapor deposition, printing and coating, and may be subjected to a curing process.

In an embodiment, the second inorganic film 23 is positioned on the organic film 22. The second inorganic film 23 performs substantially the same or a similar function as the first inorganic film 21, and is made of a material substantially the same as or similar to that of the first inorganic film 21. The second inorganic film 23 completely covers the organic film 22. In some embodiments, the second inorganic film 23 and the first inorganic film 21 contact each other in the non-display area NDA and form an inorganic-inorganic junction. However, embodiments of the structure of the encapsulation layer 20 are not limited thereto, and in other embodiments, the laminated structure of the encapsulation layer 20 can vary. Alternatively, in other embodiments, the encapsulation layer 20 is formed of a glass substrate, etc.

In an embodiment, the touch sensor 40 is disposed on the encapsulation layer 20. In an embodiment, the touch sensor 40 is located directly on the encapsulation layer 20. That is, the encapsulation layer 20 functions as a base portion of the touch sensor 40.

In an embodiment, the touch sensor 40 includes a touch element layer 41 and a protective layer 43. The touch element layer 41 includes a touch electrode and touch signal lines connected to the touch electrode. In an embodiment, the touch electrode includes a metal, and has a mesh shape. That is, the touch electrode is formed of a metal mesh pattern, thereby improving flexibility of the touch element layer 41.

In an embodiment, the protective layer 43 is positioned on the touch element layer 41 and protects the touch element layer 41. In an embodiment, the protective layer 43 includes an organic material, such as an acrylic polymer. When the protective layer 43 is made of an organic material, the touch sensor 40 is more flexible.

Referring back to FIGS. 3 and 4, in an embodiment, the front laminated structure 200 is disposed on the front side of the display panel 100. The front laminated structure 200 includes an optical film 230, a cover window 220, and a cover window protection layer 210 that are sequentially laminated forward from the display panel 100.

In an embodiment, the optical film 230 polarizes light passing therethrough. The optical film 230 reduces reflection of external light. In an embodiment, the optical film 230 includes a polarizing layer (see item 400 in FIG. 6) and a plurality of optical compensation layers (see items 450, 460, and 490 in FIG. 6). A detailed description thereof will be provided below.

In an embodiment, the cover window 220 is disposed on the front side of the optical film 230. The cover window 220 protects the display panel 100. The cover window 220 is made of a transparent material. The cover window 220 includes, for example, glass or plastic.

In an embodiment, when the cover window 220 includes glass, the glass is ultra-thin glass (UTG) or thin glass. When the glass is ultra-thin glass or thin glass, it is flexible so that it can be curved, bent, folded, or rolled. The thickness of the glass may be, for example, in the range of 10 μm to 300 μm, in particular, in the range of 10 μm to 100 μm, or may be about 50 μm. The glass of the cover window 220 includes one or more of a soda-lime glass, an alkali aluminosilicate glass, a borosilicate glass, or a lithium alumina silicate glass. The glass of the cover window 220 includes chemically strengthened or thermally strengthened glass to increase rigidity. Chemical strengthening can be achieved through an ion exchange process in alkaline salts. The ion exchange process can be performed two or more times. In addition, the cover window 220 can be obtained by coating glass thin films on both surfaces of a polymer film.

In an embodiment, when the cover window 220 includes plastic, the cover window 220 is more flexibile for being folded. Examples of plastics applicable to the cover window 220 include, but are not limited to, polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymer, polyethersulphone (PES), polyetherimide (PEI), polyphenylene sulfide (PPS), polyarylate (PAR), triacetyl cellulose (TAC), or cellulose acetate propionate (CAP). The plastic cover window 220 can include one or more of the plastic materials mentioned above.

In an embodiment, the cover window protection layer 210 is disposed on the front side of the cover window 220. The cover window protection layer 210 can prevent scattering, absorb impacts, prevent scratches, prevent fingerprint smudges and glare on the cover window 220. The cover window protection layer 210 includes a transparent polymer film. The transparent polymer film includes at least one of polyethylene terephthalate (PET), polyethylene naphthalate (PEN), polyether sulfone (PES), polyimide (PI), polyarylate (PAR), polycarbonate (PC), polymethyl methacrylate (PMMA), or cycloolefin copolymer (COC) resin.

In an embodiment, the front laminated structure 200 includes front bonding members 251 to 253 that bond adjacent laminated members. For example, a first bonding member 251 is disposed between and bonds the cover window protection layer 210 and the cover window 220, a second bonding member 252 is disposed between and bonds the cover window 220 and the optical film 230. A third bonding member 253 is disposed between and bonds the optical film 230 and the display panel 100. That is, the front bonding members 251 to 253 attach the layers to one surface of the display panel 100. The first bonding member 251 is a protection layer bonding member that attaches the cover window protection layer 210, the second bonding member 252 is a window bonding member that attaches the cover window 220, and the third bonding member 253 is an optical film bonding member that attaches the optical film 230. The front bonding members 251 to 253 are all optically transparent.

In an embodiment, the rear laminated structure 300 is disposed on the rear side of the display panel 100. The rear laminated structure 300 includes a polymer film layer 310, a cushion layer 320, and a plate 330, and a heat dissipation portion 340 that are sequentially laminated rearward from the display panel 100.

In an embodiment, the polymer film layer 310 is disposed on the rear side of the display panel 100. The polymer film layer 310 includes a polymer film. The polymer film layer 310 includes, for example, at least one of polyimide (PI), polyethylene terephthalate (PET), polycarbonate (PC), polyethylene (PE), polypropylene (PP), polysulfone (PSF), polymethylmethacrylate (PMMA), triacetylcellulose (TAC), or cycloolefin polymer (COP), etc. The polymer film layer 310 includes a functional layer on at least one surface thereof. The functional layer includes, for example, a light absorbing layer. The light absorbing layer includes a light absorbing material such as a black pigment or dye. The light absorbing layer is formed by coating or printing black ink on a polymer film.

In an embodiment, the cushion layer 320 is disposed on the rear side of the polymer film layer 310. The cushion layer 320 absorbs external impacts and prevents damage to the display panel 100. The cushion layer 320 may be formed of a single layer or a plurality of laminated layers. The cushion layer 320 includes, for example, an elastic material such as polyurethane or polyethylene resin. In an embodiment, the cushion layer 320 is made of a foam material similar to a sponge.

In an embodiment, the plate 330 is disposed on the rear side of the cushion layer 320. The plate 330 is a support member that bonds the display device 10 to a case. The plate 330 is made of a rigid material. In an embodiment, the plate 330 is made of a single metal or metal alloy such as stainless steel (SUS).

In an embodiment, the heat dissipation portion 340 is disposed on the rear side of the plate 330. The heat dissipation portion 340 diffuses heat generated from the display panel 100 or other portions of the display device 10. The heat dissipation portion 340 includes a metal plate. The metal plate includes a thermally conductive metal, such as copper or silver. The heat dissipation portion 340 may be a heat dissipation sheet that includes graphite or carbon nanotubes.

Although embodiments are not limited thereto, the heat dissipation portion 340 is separated by the foldable area FDA to facilitate folding of the display device 10 as illustrated in FIGS. 3 and 4. For example, a first metal plate can be disposed in the first non-foldable area NFA1, and a second metal plate can be disposed in the second non-foldable area NFA2. The first metal plate and the second metal plate are physically separated from each other with respect to the foldable area FDA.

In an embodiment, the rear laminated structure 300 includes rear bonding members 351 to 354 that bond adjacent laminated members. For example, a fourth bonding member 351 is disposed between and bonds the display panel 100 and the polymer film layer 310, a fifth bonding member 352 is disposed between and bonds the polymer film layer 310 and the cushion layer 320, a sixth bonding member 353 is disposed between and couples the cushion layer 320 and the plate 330, and a seventh bonding member 354 is disposed between and bonds the plate 330 and the heat dissipation portion 340. That is, of the rear bonding members 351 to 354 that attach the layers on the other surface of the display panel 100, the fourth bonding member 351 is a polymer film layer bonding member that attaches the polymer film layer 310, the fifth bonding member 352 is a cushion layer bonding member that attaches the cushion layer 320, the sixth bonding member 353 is a plate bonding member that attaches the plate 330, and the seventh bonding member 354 is a heat dissipation portion bonding member that attaches the heat dissipation portion 340. When the heat dissipation portion 340 is separated with respect to the foldable area FDA, the seventh bonding member 354 may also be separated in the same way, but may also be continuous as illustrated in FIG. 3 without being separated by the non-foldable areas NFA1 and NFA2.

In an embodiment, when the display device 10 displays an image only on the front surface, the rear bonding members 351 to 354 are not necessarily optically transparent, unlike the front bonding members 251 to 253.

As described above, in an embodiment, the optical film 230 is disposed in front of the display panel 100 and absorbs external light incident on the front of the display panel 100, thereby preventing reflection thereof. Hereinafter, the optical film 230 that can prevent light leakage by reducing reflectance in a lateral direction will be described.

Figure 6:
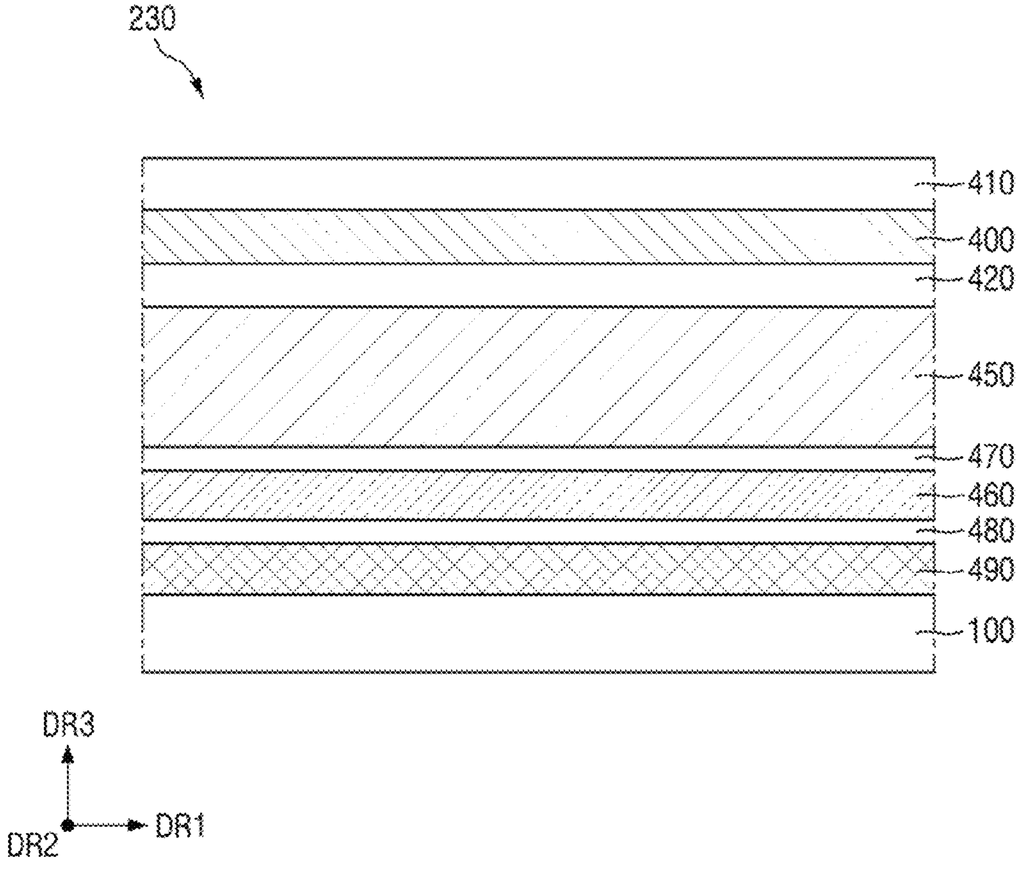
FIG. 6 is a cross-sectional view of an optical film according to an embodiment.

FIG. 6 is a cross-sectional view of an optical film 230 according to an embodiment.

Referring to FIG. 6, the optical film 230 according to an embodiment includes a polarizing layer 400, a first optical compensation layer 450, a second optical compensation layer 460, and a third optical compensation layer 490.

In an embodiment, the polarizing layer 400 converts natural light or polarized light into arbitrarily polarized light. For example, it can convert external light incident on the display device 10 into linearly polarized light. The polarizing layer 400 can stretch in one direction. The stretching direction of the polarizing layer 400 is an absorption axis, and a direction perpendicular thereto is a transmission axis. In an embodiment, the transmission axis of the polarizing layer 400 is at 0 degrees. The polarizing layer 400 is disposed farthest from the display panel 100 of the constituent layers of the optical film 230 and converts external light incident from the outside into linearly polarized light.

In an embodiment, the polarizing layer 400 is made of a polymer material whose main component is a polyvinyl alcohol (PVA) resin that contains iodine or a dichroic dye. However, embodiments of the present disclosure are not limited thereto, and in other embodiments, the polarizing layer 400 can be an O-type polarizer prepared by aligning a liquid crystal composition that contains a dichroic material and a liquid crystal compound in a predetermined direction, or an E-type polarizer prepared by aligning lyotropic liquid crystals in a predetermined direction, etc.

In an embodiment, a first protective member 410 and a second protective member 420 are disposed above the polarizing layer 400 and under the polarizing layer 400, respectively. The first protective member 410 is disposed on the top surface of the polarizing layer 400 in the third direction DR3. The second protective member 420 is disposed on the bottom surface of the polarizing layer 400 in a direction opposite to the third direction DR3.

In an embodiment, the first and second protective members 410 and 420 protect the polarizing layer, and are formed of a typical retardation-free protection film. The first protective member 410 and the second protective member 420 can be formed of, for example, one or more of triacetyl cellulose (TAC), polymethyl methacrylate (PMMA), polyethylene terephthalate (PET), or cycloolefin (COP), etc.

In an embodiment, the first optical compensation layer 450 is disposed under the polarizing layer 400. The first optical compensation layer 450 compensates for distortion of the axis of the polarizing layer 400, which is generated in an off-axis. For example, the first optical compensation layer 450 improves black visibility of the side.

In an embodiment, the first optical compensation layer 450 includes at least one of a cycloolefin polymer (COP), a cycloolefin copolymer (COC), polycarbonate (PC), polystyrene (PS), methyl methacrylate-styrene (MS), polymethyl methacrylate (PMMA), or triacetyl cellulose (TAC). In addition, the first optical compensation layer 450 includes a liquid crystal compound, for example, a liquid crystal compound that has a nematic liquid crystal phase. The liquid crystal compound is a liquid crystal polymer or a liquid crystal monomer of a polymerizable mesogenic compound. The liquid crystal compound may be a discotic liquid crystal compound or a rod-like liquid crystal compound. The first optical compensation layer 450 may be fabricated as a film type or a liquid crystal type depending on the material.

In an embodiment, the first optical compensation layer 450 is a retardation plate, such as a biaxial plate, and has refractive indices of nx, ny, and nz in a spatial coordinate system. Typically, optical characteristics of a retardation layer are represented by characteristics with respect to 550 nm wavelength light that can be easily obtained, unless otherwise mentioned about the wavelength of a light source. The optical characteristics of the retardation layer are defined by its refractive indices.

In an embodiment, the first optical compensation layer 450 has a refractive index ratio Nz defined by Equation 1, below.

$$Nz=(nx-nz)/(nz-ny) \quad \text{Equation 1}$$

Here, nx is a refractive index of an axis of the first optical compensation layer having the largest refractive index in a planar direction 450, ny is a refractive index in a planar direction perpendicular to the nx axis, and nz is a refractive index in the thickness direction.

In the first optical compensation layer 450 of an embodiment of the present disclosure, the refractive indices nx, ny, and nz in three directions may satisfy a relationship of nx>ny, nz. According to Eq. 1, the refractive index ratio Nz of the first optical compensation layer 450 may range from 0.5 to 2.5.

In an embodiment, the first optical compensation layer 450 has an in-plane retardation value Ro defined by Equation 2, below, while satisfying the refractive index ratio Nz.

$$Ro=(nx-ny)*d \quad \text{Equation 2}$$

Here, d is the thickness of the first optical compensation layer 450.

In an embodiment, the thickness of the first optical compensation layer 450 ranges from 1 to 100 μm, but embodiments are not limited thereto. The in-plane retardation value Ro of the first optical compensation layer 450 ranges from 0 to 300 nm, and may range from 170 to 270 nm. The in-plane retardation value Ro of the first optical compensation layer 450 is selected from a range that satisfies the refractive index ratio Nz.

In an embodiment, a retardation value Rth of the first optical compensation layer 450 in the thickness direction is determined from Equation 3, below, based on the refractive index ratio Nz and the in-plane retardation value Ro described above.

$$Rth=[(nx-ny)/2-nz]*d \quad \text{Equation 3}$$

According to Eq. 3, the retardation value Rth of the first optical compensation layer 450 in the thickness direction ranges from 0 to 200 nm, and may range from 4 to 84 nm. The retardation value Rth of the first optical compensation layer 450 in the thickness direction is selected from within the above-described range.

In an embodiment, an angle between the transmission axis of the polarizing layer 400 and an optical axis of the first optical compensation layer 450 ranges from 86 to 94 degrees. That is, the optical axis of the first optical compensation layer 450 is tilted from 86 to 94 degrees with respect to the transmission axis of the polarizing layer 400. In an embodiment, the first optical compensation layer 450 described above can compensate for distortion of the optical axis at the side. A detailed description thereof will be provided below.

In addition, in an embodiment, the second optical compensation layer 460 is disposed under the first optical compensation layer 450. The second optical compensation layer 460 converts linearly polarized light incident received from the first optical compensation layer 450 into circularly or elliptically polarized light. The second optical compensation layer 460 is a quarter (λ/4) wave plate. In an embodiment, an optical axis (slow axis) of the second optical compensation layer 460 is at 45 degrees. The second optical compensation layer 460 is made of the materials listed above with regard to the first optical compensation layer 450.

In an embodiment, the third optical compensation layer 490 is disposed under the second optical compensation layer 460. The third optical compensation layer 490 is in direct contact with the top surface of the display panel 100. The third optical compensation layer 490 retards the phase of circularly or elliptically polarized light incident received from the second optical compensation layer 460. The third optical compensation layer 490 is a positive C plate. The third optical compensation layer 490 is made of the materials listed above with regard to the first optical compensation layer 450.

In an embodiment, a first adhesive member 470 is disposed between the first optical compensation layer 450 and the second optical compensation layer 460. Further, a second adhesive member 480 is disposed between the second optical compensation layer 460 and the third optical compensation layer 490.

In an embodiment, the first and second adhesive members 470 and 480 include an acrylic copolymer that has a superior elastic modulus and adhesive property, and can prevent delamination by reducing generation of fine bubbles. In an embodiment, the first and second adhesive members 470 and 480 are pressure sensitive adhesives (PSA). The first and second adhesive members 470 and 480 not only serve as adhesives, but also protect the compensation layers or the display panel 100 from external impacts, because they have a predetermined elasticity.

Since the optical film 230 according to an embodiment includes the polarizing layer 400, the first optical compensation layer 450, the second optical compensation layer 460, and the third optical compensation layer 490, reflection of external light that is incident on the side from the outside can be reduced. Hereinafter, an action of reducing reflection of external light by the optical film 230 will be described in detail with reference to other drawings.

Figure 7:
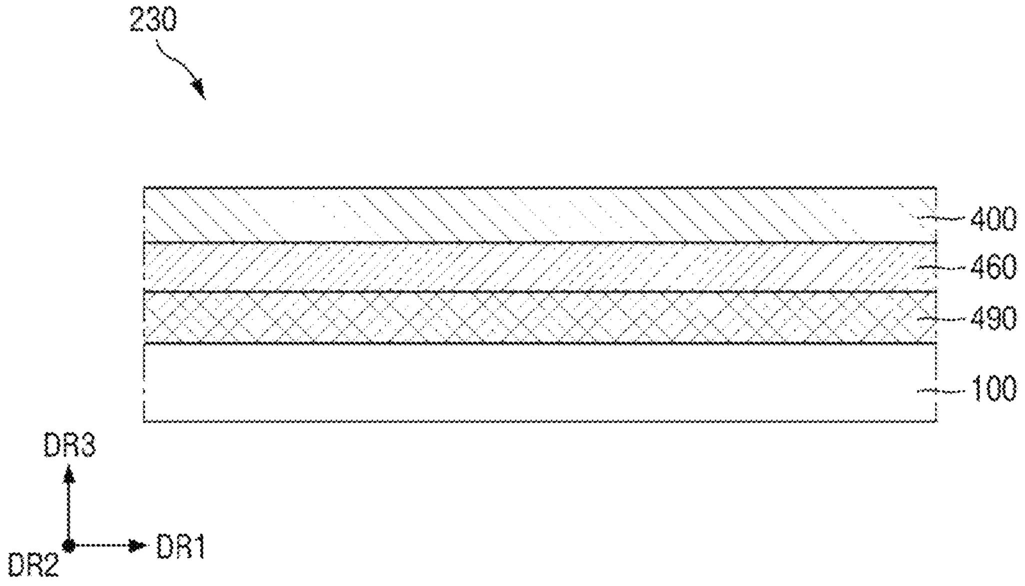
FIG. 7 is a cross-sectional view of an optical film according to a comparative example.
Figure 8:
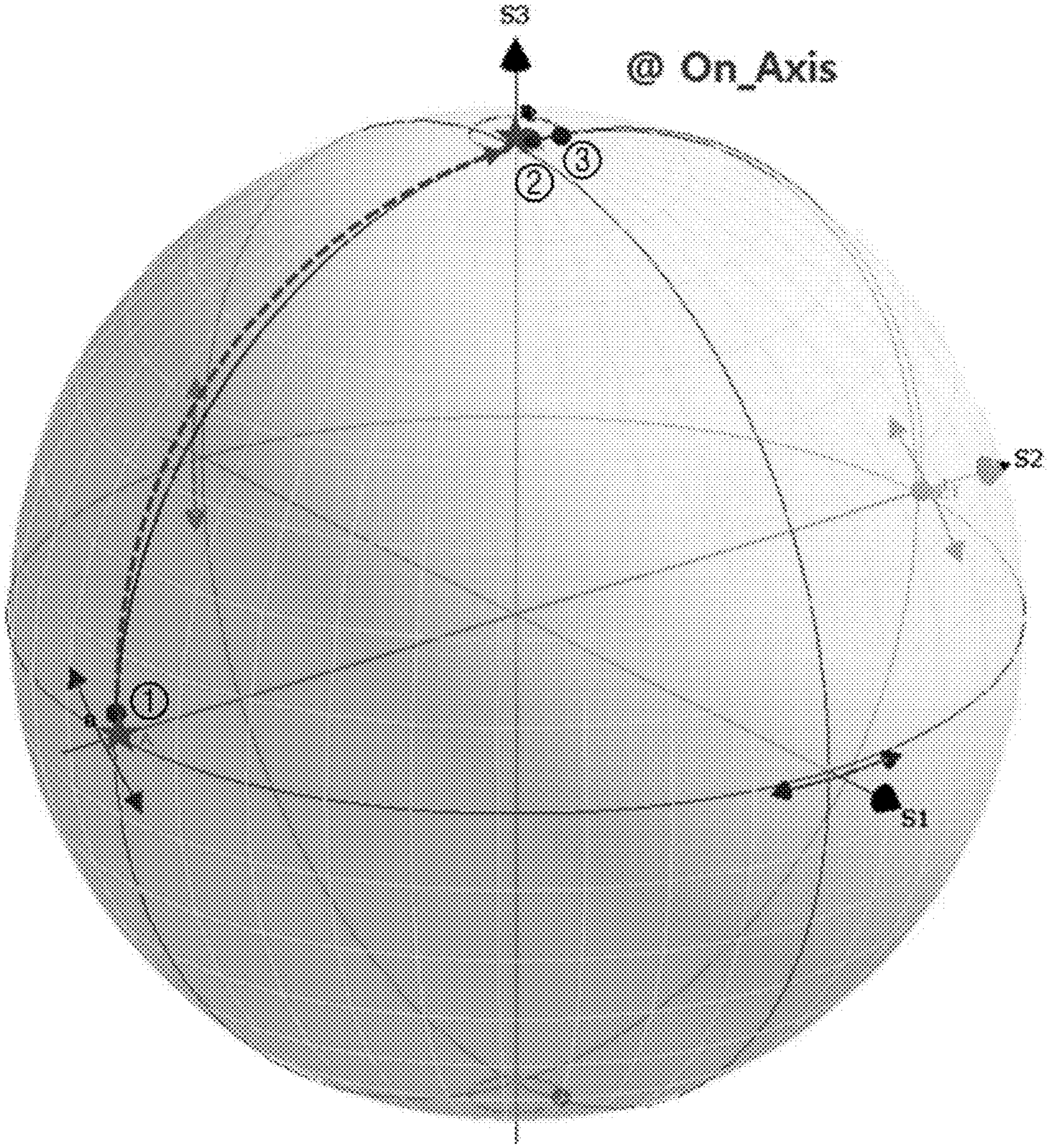
FIG. 8 illustrates polarization of light that has passed through the optical film of the comparative example, as a Poincare sphere, when viewed from the front.
Figure 9:
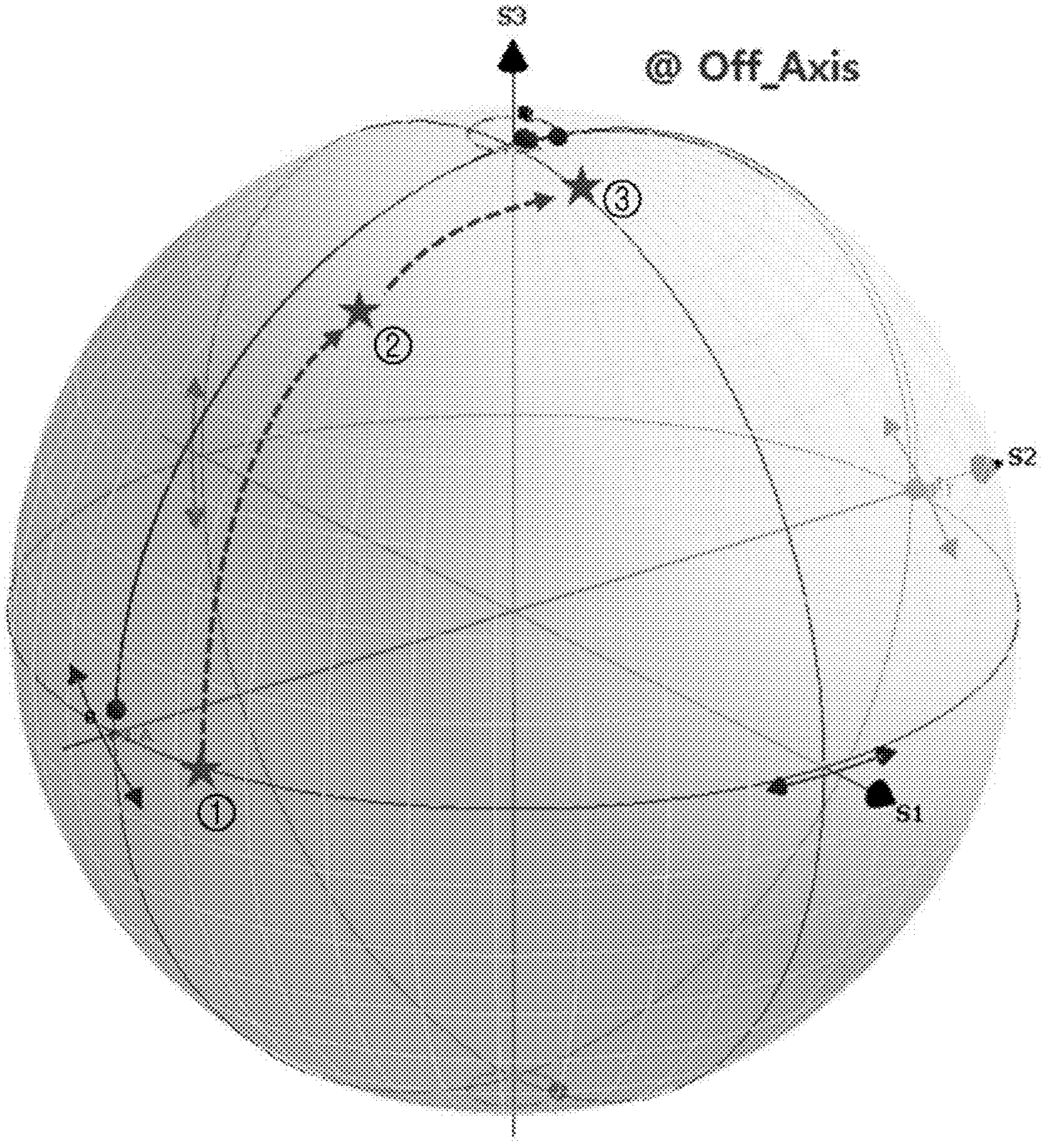
FIG. 9 illustrates polarization of light that has passed through an optical film of the comparative example, with a Poincare sphere, when viewed from the side.

FIG. 7 is a cross-sectional view of an optical film according to a comparative example. FIG. 8 is illustrates polarization of light that has passed through the optical film of a comparative example, as a Poincaré sphere viewed from the front. FIG. 9 illustrates polarization of light that has passed through the optical film of a comparative example, as a Poincaré sphere viewed from the side. FIG. 7 will be described by using the same reference numbers to refer to substantially the same components of the optical film described with reference to FIG. 6.

Referring to FIG. 7, an optical film according to a comparative example includes the polarizing layer 400, the second optical compensation layer 460 that is the quarter wave plate, and the third optical compensation layer 490 that is the positive C plate, which are stacked.

Referring to FIG. 8 in conjunction with FIG. 7, when viewed from the front, external light incident on the optical film is converted into 0 degree linearly polarized light in the polarizing layer 400 and is located at a position ①. Since the linearly polarized light transmitted through the polarizing layer 400 is converted into right-handed circularly polarized light by being phase-shifted half a wavelength by a quarter wavelength retardation value and the 45 degree optical axis (slow axis) of the second optical compensation layer 460, it is located at S3 (target point, position ②). Since the third optical compensation layer 490 does not cause retardation from the front, the right-handed circularly polarized light remains at S3 (position ③). The right-handed circularly polarized light at S3 is reflected from the display panel 100 and has its phase changed to be left-handed circularly polarized light. Then, it is converted into 90 degree linearly polarized light in the second optical compensation layer 460, and is finally absorbed by the polarizing layer 400. Therefore, when viewed from the front, external light is absorbed by the optical film, so that reflected light may be reduced.

Referring to FIG. 9 in conjunction with FIG. 7, when viewed from the side, external light incident on the optical film is converted into linearly polarized light distorted due to distortion of the absorption axis of the polarizing layer 400 and is located at a position ①. The linearly polarized light transmitted through the polarizing layer 400 is converted into right-handed circularly polarized light by being phase-shifted half a wavelength by the quarter wavelength retardation value and the 45 degree optical axis (slow axis) of the second optical compensation layer 460. However, it fails to be located at S3 (target point), but is located at a position ② before S3 due to distortion of the optical axis. Subsequently, the phase-shift of the light incident on the third optical compensation layer 490 is corrected by the retardation value Rth of the third optical compensation layer 490 in the thickness direction, so that the right-handed circularly polarized light is located at a position ③. The incomplete right-handed circularly polarized light at the position ③ is reflected from the display panel 100 and has its phase changed to be incomplete left-handed circularly polarized light. Then, it is converted into incomplete linearly polarized light in the second optical compensation layer 460. A portion of the incomplete linearly polarized light is absorbed by the polarizing layer 400, while the other portion is transmitted to be visibly recognized as light leakage.

However, since the optical film 230 according to an embodiment includes the polarizing layer 400, the first optical compensation layer 450, the second optical compensation layer 460, and the third optical compensation layer 490, it is possible to reduce light leakage by reducing reflected light when viewed from the side.

Figure 10:
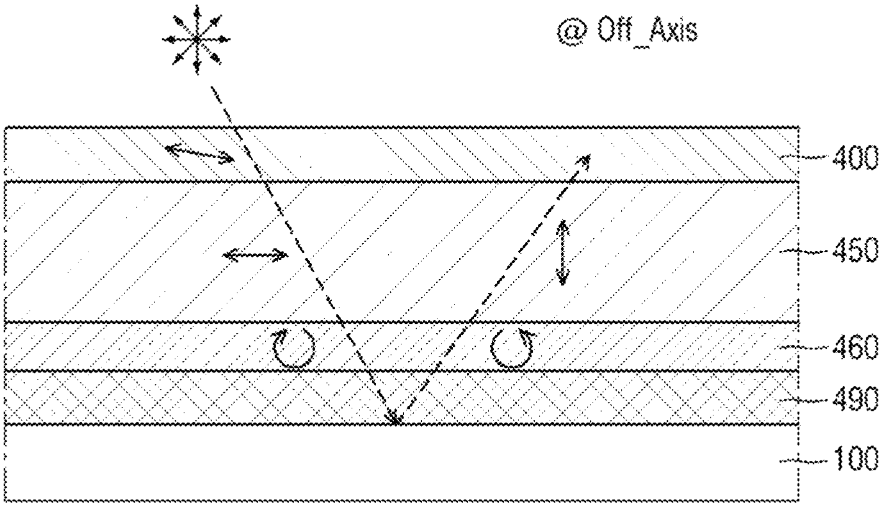
FIG. 10 is a cross-sectional view of an optical film according to one embodiment.
Figure 11:
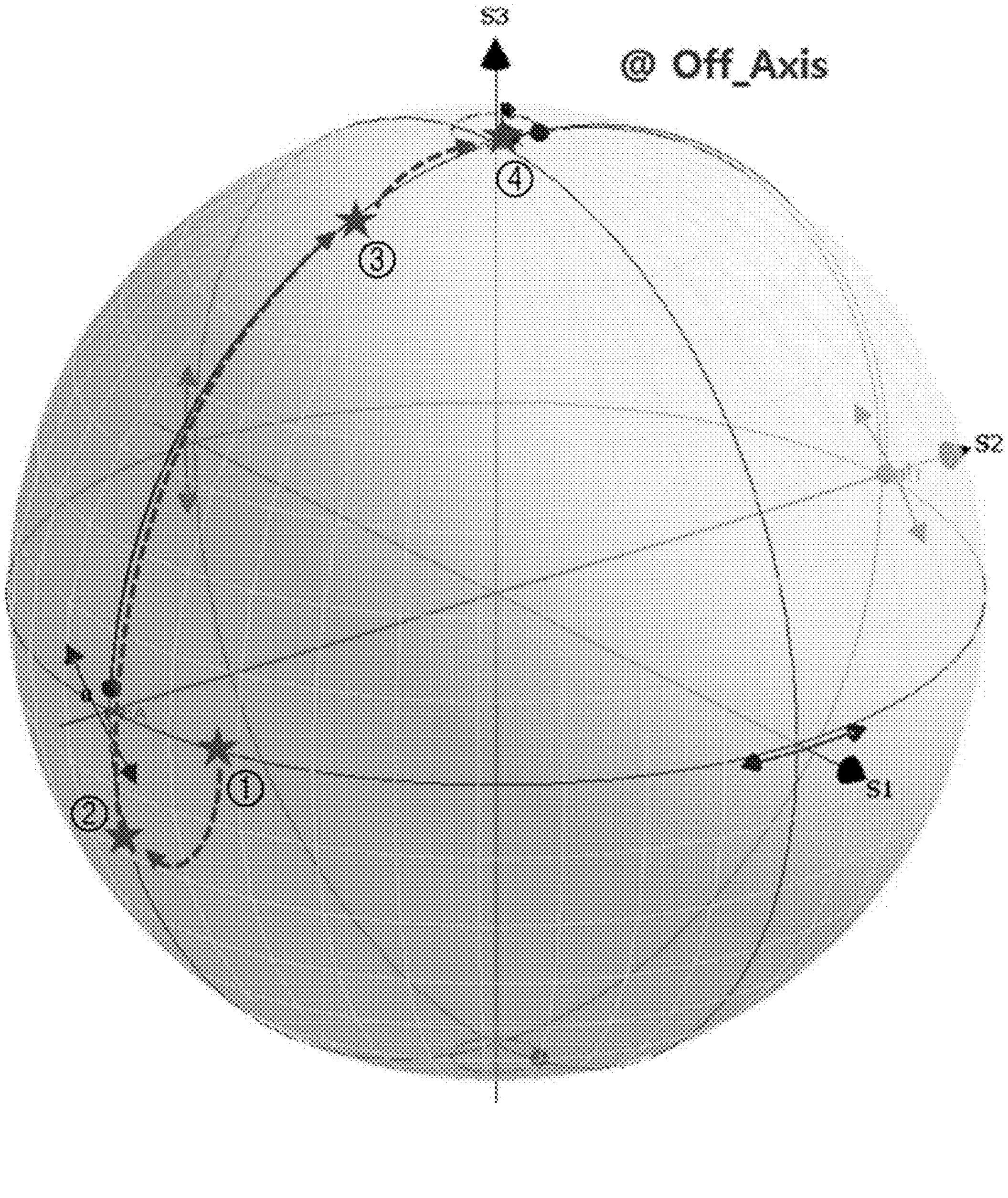
FIG. 11 illustrates polarization of light that has passed through an optical film of an embodiment, with a Poincare sphere, when viewed from the side.

FIG. 10 is a cross-sectional view of an optical film according to an embodiment. FIG. 11 illustrates polarization of light that has passed through an optical film of an embodiment, with a Poincaré sphere viewed from the side.

Referring to FIGS. 10 and 11, in an embodiment, when viewed from the side, external light incident on the optical film 230 is converted into linearly polarized light that is distorted due to the distortion of the absorption axis of the polarizing layer 400 and is located at a position ①. The linearly polarized light transmitted through the polarizing layer 400 is located at a position ②) by being compensated for the position due to the distortion of the absorption axis of the polarizing layer 400 by a retardation value and a 90 degree optical axis of the first optical compensation layer 450. Then, it is converted into right-handed circularly polarized light by being phase-shifted half a wavelength by the quarter wavelength retardation value and the 45 degree optical axis of the second optical compensation layer 460. However, the right-handed circularly polarized light fails to be located at S3 (target point), but is located at a position ③ before S3 due to the distortion of the optical axis. Then, the phase-shift is corrected by the retardation value Rth of the third optical compensation layer 490 in the thickness direction, so that the right-handed circularly polarized light is located at S3 (target point, position ④). The right-handed circularly polarized light at the position ④ is reflected from the display panel 100 and has its phase changed to be left-handed circularly polarized light. Then, it is converted into 90 degree linearly polarized light in the second optical compensation layer 460. The linearly polarized light is absorbed by the polarizing layer 400, thereby reducing reflected light and reducing light leakage.

Figure 12:
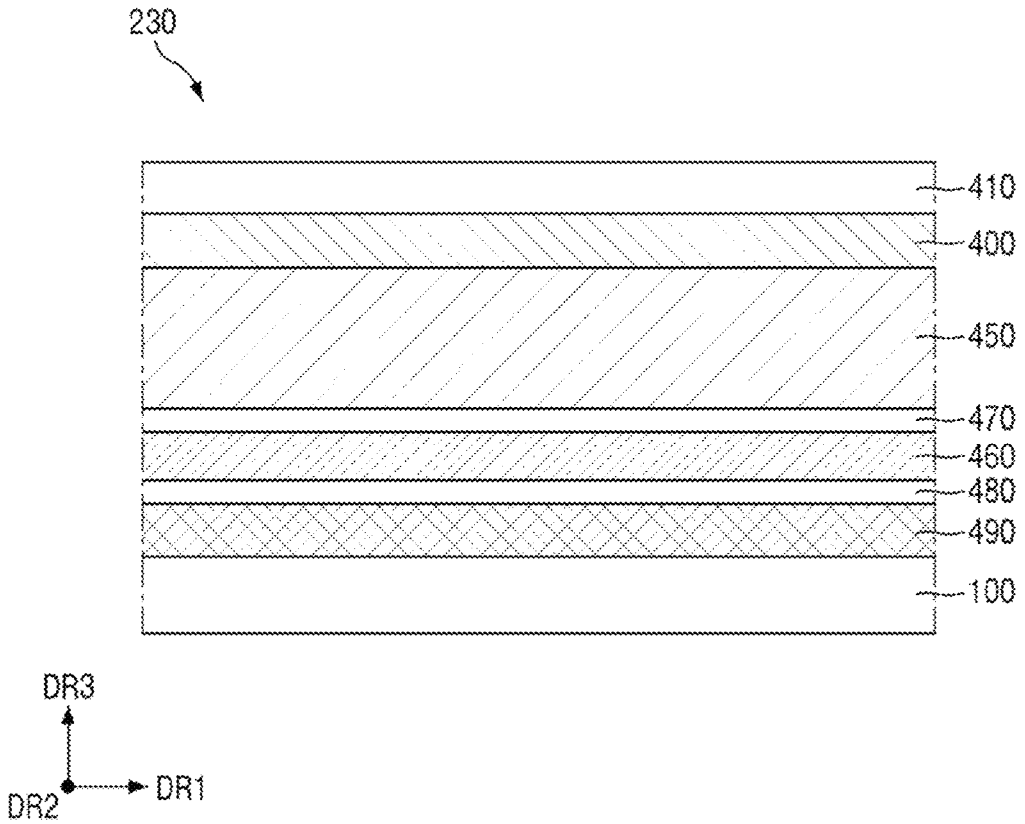
FIG. 12 is a cross-sectional view of an optical film according to an embodiment.

FIG. 12 is a cross-sectional view illustrating an optical film according to an embodiment.

Referring to FIG. 12, the optical film 230 according to an embodiment includes the polarizing layer 400, the first optical compensation layer 450, the second optical compensation layer 460, and the third optical compensation layer 490. This embodiment differs from an embodiment of FIG. 6 described above in that it omits the second protective member 420 disposed between the polarizing layer 400 and the first optical compensation layer 450. Hereinafter, a description will be given of different configurations and a description of the same configurations will be omitted.

In an embodiment, the polarizing layer 400 is disposed on the first optical compensation layer 450. The first optical compensation layer 450 is in direct contact with the bottom surface of the polarizing layer 400, which is disposed in a direction opposite to the third direction DR3. The first optical compensation layer 450 is directly coated on or adhered to the bottom surface of the polarizing layer 400. Since the second protective member 420 of FIG. 6 does not have a retardation property, it does not affect the polarization of light. Therefore, by omitting the second protective member 420, the process can be simplified and the thickness of the optical film 230 can be decreased.

Figure 13:
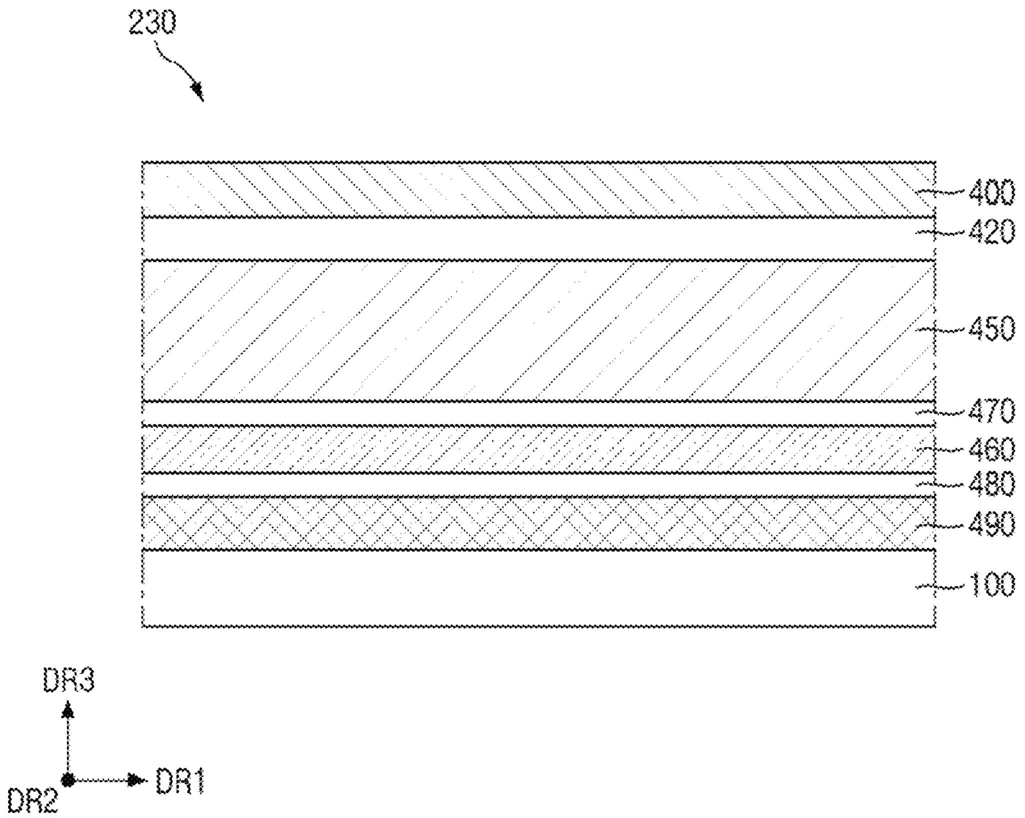
FIG. 13 is a cross-sectional view of an optical film according to an embodiment.

FIG. 13 is a cross-sectional view of an optical film according to an embodiment.

Referring to FIG. 13, the optical film 230 according to an embodiment may include the polarizing layer 400, the first optical compensation layer 450, the second optical compensation layer 460, and the third optical compensation layer 490. This embodiment differs from an embodiment of FIG. 6 described above in that it omits the first protective member 410 disposed on the polarizing layer 400. Hereinafter, a description will be given of different configurations and a description of the same configurations will be omitted.

In an embodiment, the polarizing layer 400 is disposed at the top layer of the optical film 230. That is, no optical layer is disposed on the polarizing layer 400. As described above, since the first protective member 410 of FIG. 6 does not have a retardation property, it does not affect the polarization of light. Therefore, by omitting the first protective member 410, the process can be simplified and the thickness of the optical film 230 can be decreased.

Figure 14:
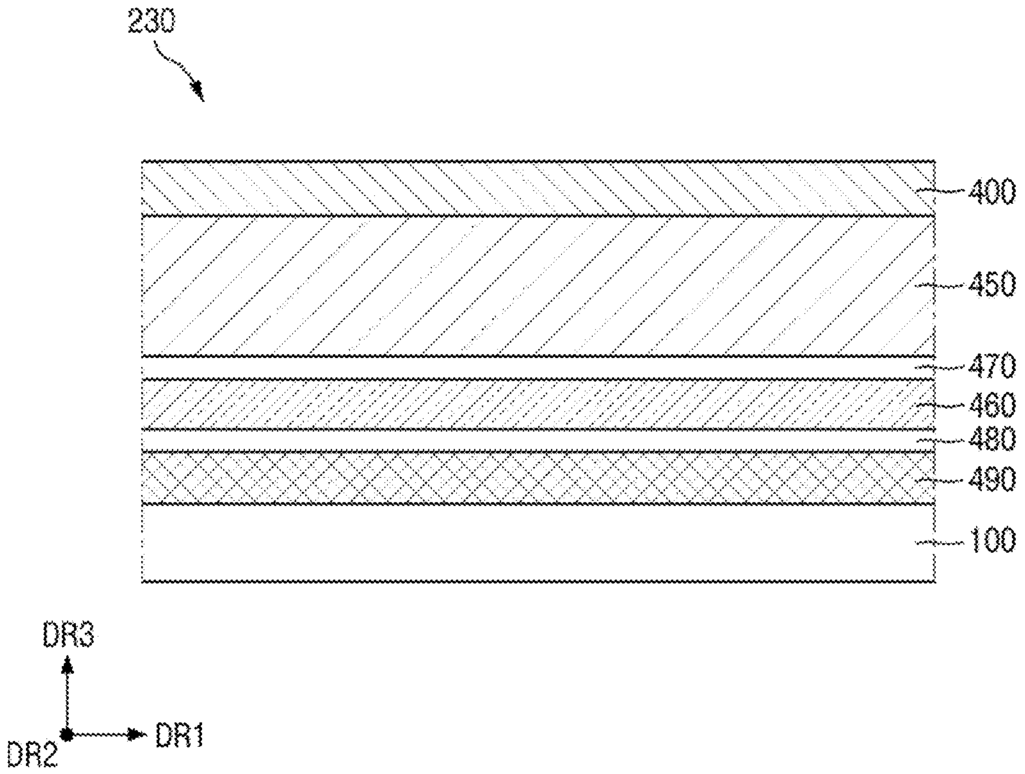
FIG. 14 is a cross-sectional view of an optical film according to an embodiment.

FIG. 14 is a cross-sectional view of an optical film according to an embodiment.

Referring to FIG. 14, the optical film 230 according to an embodiment includes the polarizing layer 400, the first optical compensation layer 450, the second optical compensation layer 460, and the third optical compensation layer 490. This embodiment differs from an embodiment of FIG. 6 described above in that it omits the first protective member 410 disposed on the polarizing layer 400 and the second protective member 420 disposed between the polarizing layer 400 and the first optical compensation layer 450. Hereinafter, a description will be given of different configurations and a description of the same configurations will be omitted.

In an embodiment, the top layer of the optical film 230 is the polarizing layer 400, and the first optical compensation layer 450 is disposed in direct contact with the bottom surface of the polarizing layer 400. Since neither of the first protective member 410 and the second protective member 420 of FIG. 6 have a retardation property, they do not affect the polarization of light. Therefore, by omitting the first protective member 410 and the second protective member 420, the process can be simplified and the thickness of the optical film 230 can be decreased.

Figure 15:
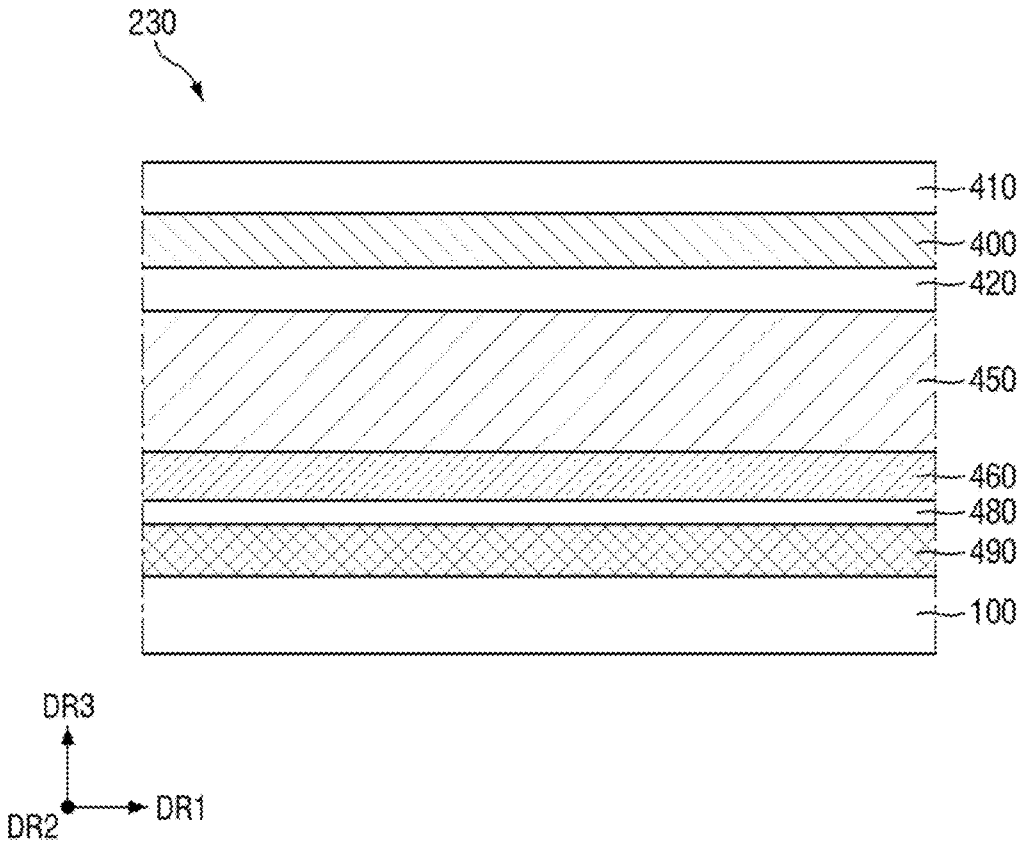
FIG. 15 is a cross-sectional view of an optical film according to an embodiment.

FIG. 15 is a cross-sectional view of an optical film according to an embodiment.

Referring to FIG. 15, the optical film 230 according to an embodiment includes the polarizing layer 400, the first optical compensation layer 450, the second optical compensation layer 460, and the third optical compensation layer 490. This embodiment differs from an embodiment of FIG. 6 described above in that it omits the first adhesive member 470 disposed between the first optical compensation layer 450 and the second optical compensation layer 460. Hereinafter, a description will be given of different configurations and a description of the same configurations will be omitted.

In an embodiment, the first optical compensation layer 450 is disposed on the second optical compensation layer 460. The second optical compensation layer 460 is disposed in direct contact with the bottom surface of the first optical compensation layer 450, which is disposed in the direction opposite to the third direction DR3. The second optical compensation layer 460 is directly coated on or adhered to the bottom surface of the first optical compensation layer 450. Since the first adhesive member 470 of FIG. 6 does not have a retardation property, it does not affect the polarization of light. Therefore, by omitting the first adhesive member 470, the process can be simplified and the thickness of the optical film 230 can be decreased.

Hereinafter, embodiments will be described in more detail through fabrication examples and experimental examples.

Fabrication Example 1: Fabrication of Display Devices

A display device of a comparative example was fabricated by attaching the optical film of the comparative example illustrated in FIG. 7 to a display panel, and a display device of an embodiment was fabricated by attaching the optical film of an embodiment illustrated in FIG. 6 to a display panel. Here, in the comparative example, an optical film was fabricated in which a third optical compensation layer, a second optical compensation layer, and a polarizing layer are sequentially stacked on the display panel. In an embodiment, an optical film was fabricated in which a third optical compensation layer, a second optical compensation layer, a first optical compensation layer, and a polarizing layer are sequentially stacked on the display panel. In this case, the refractive index ratio Nz, the in-plane retardation value Ro, and the retardation value Rth in the thickness direction of the first optical compensation layer of an embodiment were 0.7, 220 nm, 44 nm, respectively. An angle between the optical axis and the transmission axis of the polarizing layer was 90 degrees. The optical axis of the polarizing layer was at 0 degrees and the optical axis of the second optical compensation layer was at 45 degrees.

Experimental Example 1: Measurement of Reflectance and Color of Reflected Light A reflectance according to a viewing angle, a reflectance from the front (10 degree viewing angle), a color of reflected light according to an omnidirectional viewing angle, and a color of reflected light according to a viewing angle in a dark state were measured with respect a display device according to each of the comparative example and an embodiment described above. In both cases, a simulation tool used for the measurement was TechWiz LCD 1D.

Figure 16:
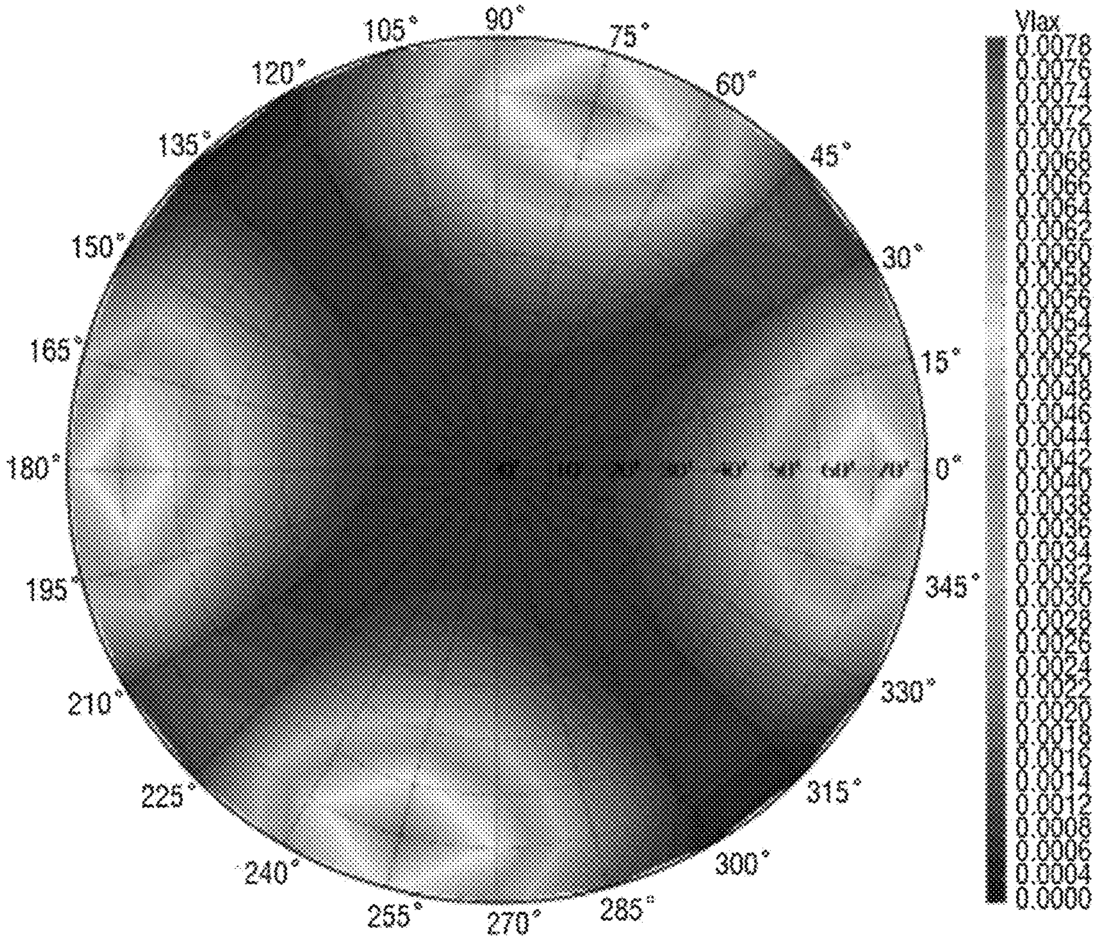
FIG. 16 illustrates reflectance according to a viewing angle of a display device according to the comparative example.
Figure 17:
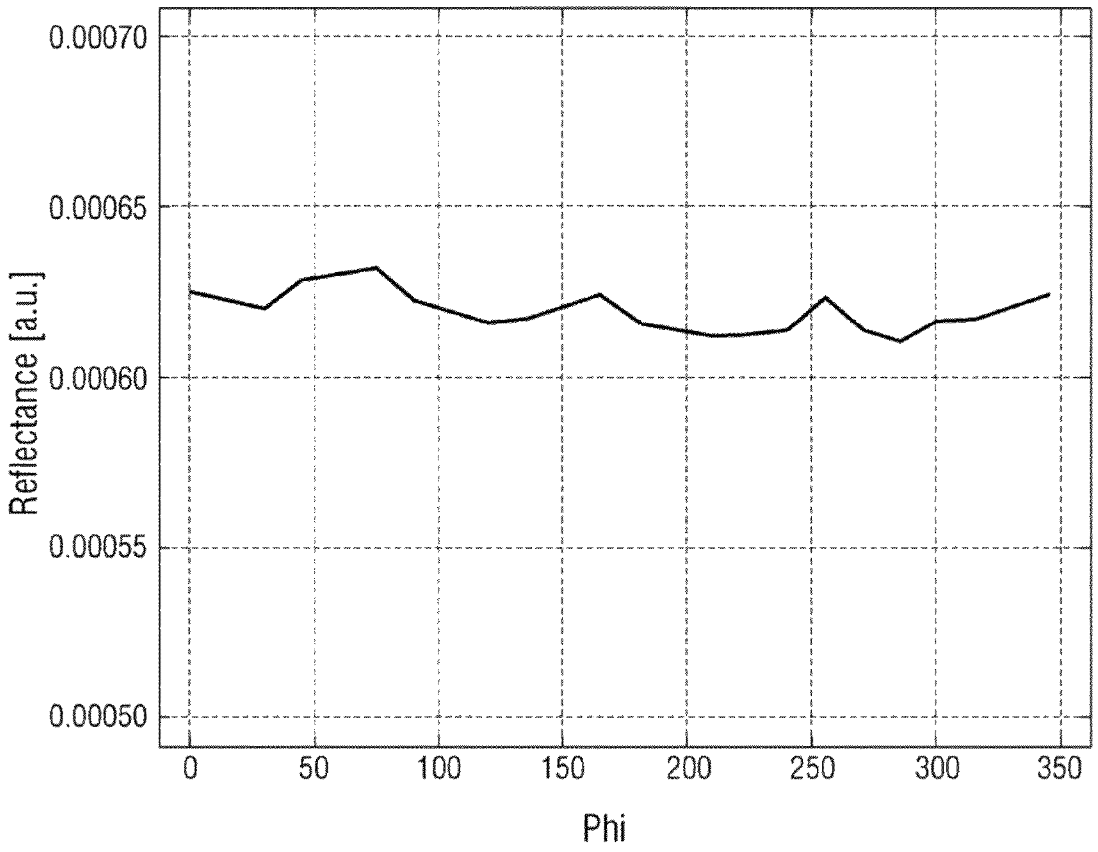
FIG. 17 is a graph of front reflectance of a display device according to the comparative example.
Figure 18:
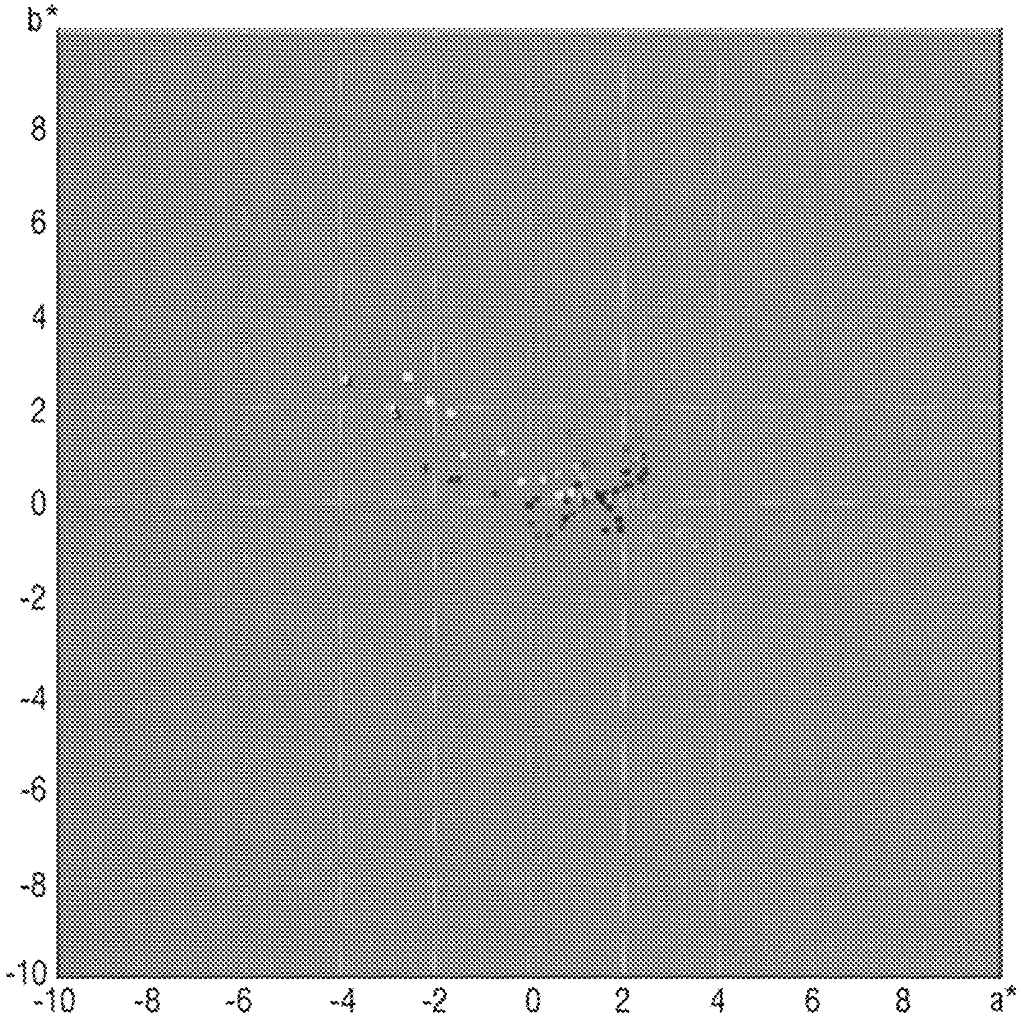
FIG. 18 illustrates LAB color space coordinates of reflected light according to an omnidirectional viewing angle in a display device according to the comparative example.
Figure 19:
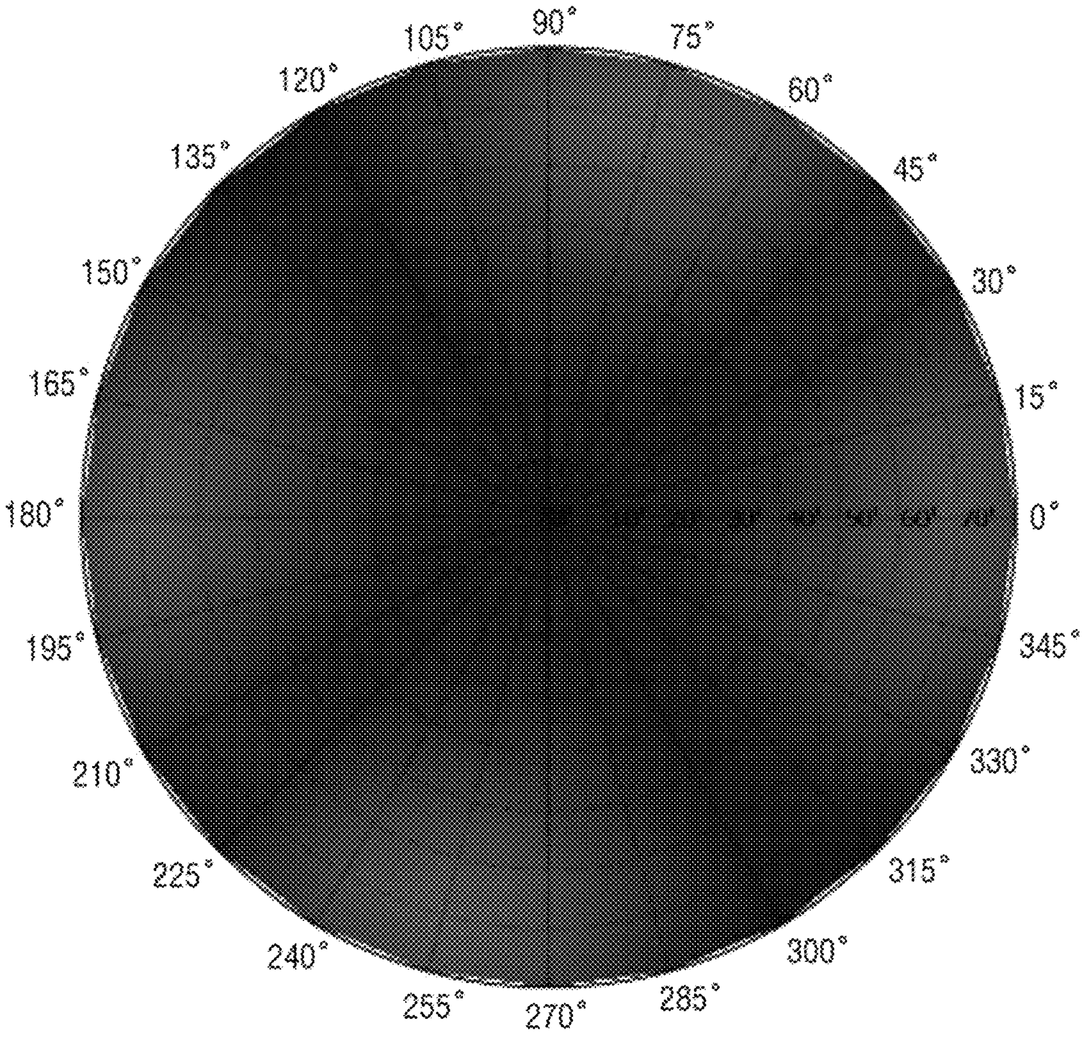
FIG. 19 shows colors of reflected light according to a viewing angle in a dark state of a display device according to the comparative example.
Figure 20:
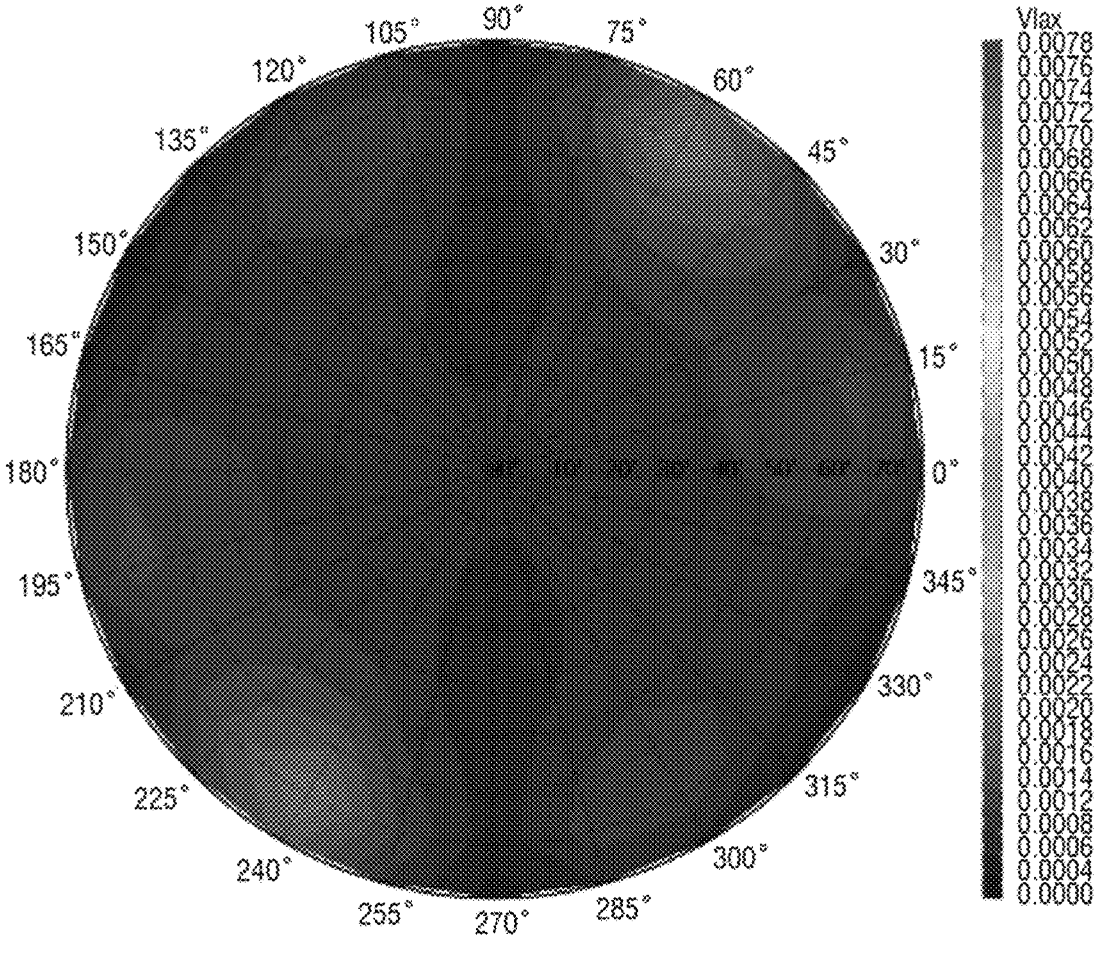
FIG. 20 illustrates reflectance according to a viewing angle of a display device according to an embodiment.
Figure 21:
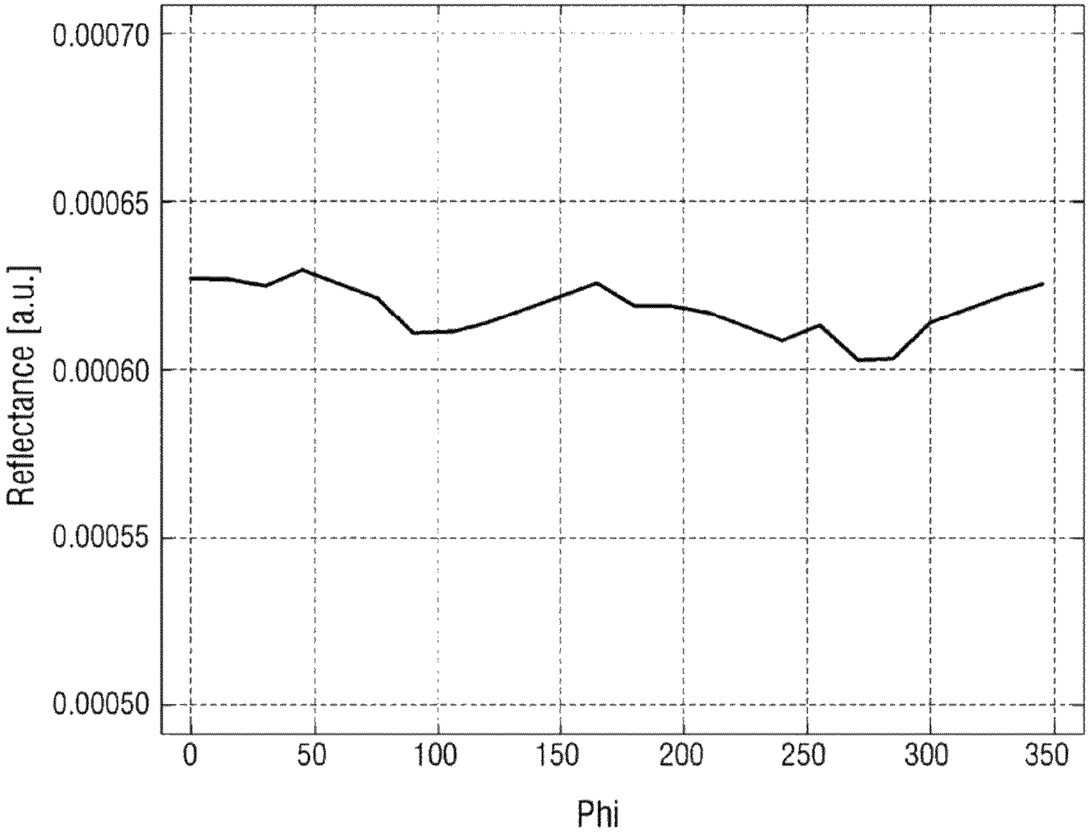
FIG. 21 is a graph of front reflectance of a display device according to an embodiment.
Figure 22:
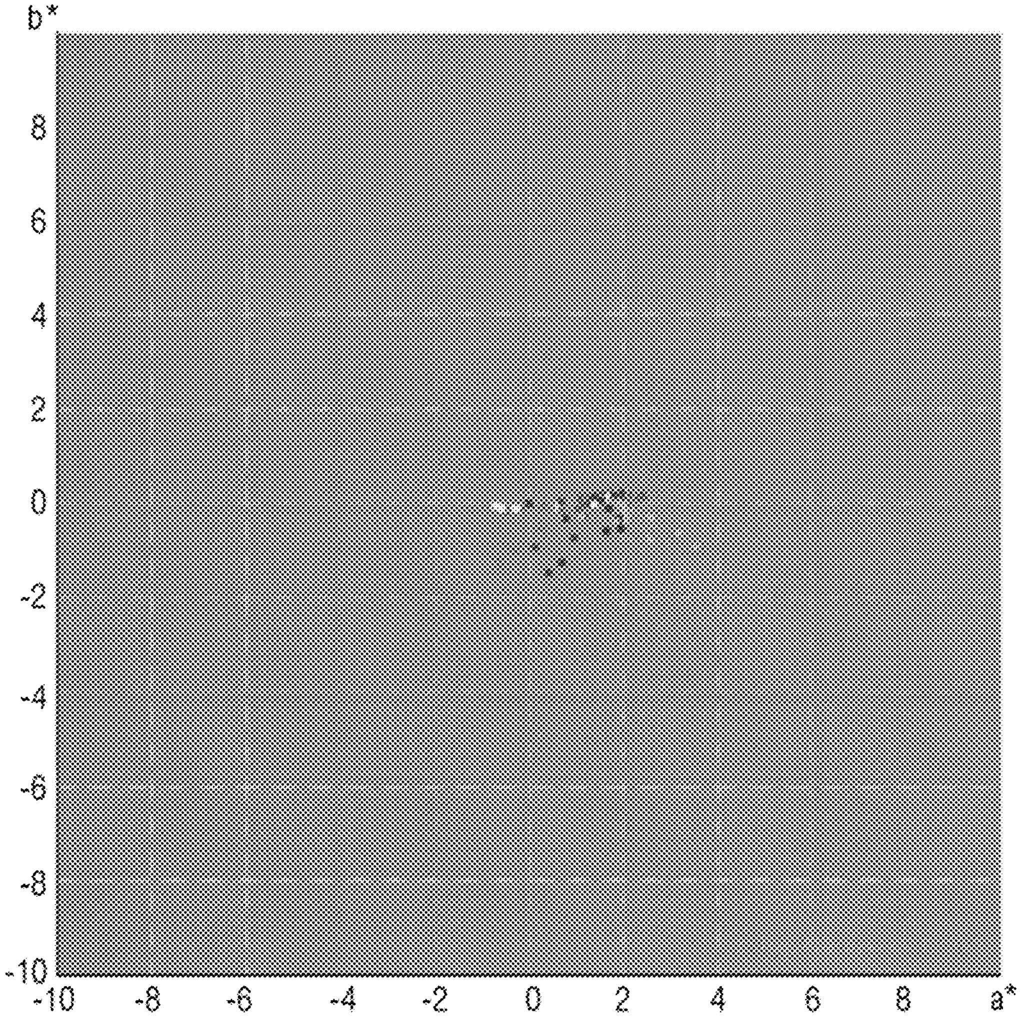
FIG. 22 illustrates LAB color space coordinates of reflected light according to an omnidirectional viewing angle in a display device according to an embodiment.
Figure 23:
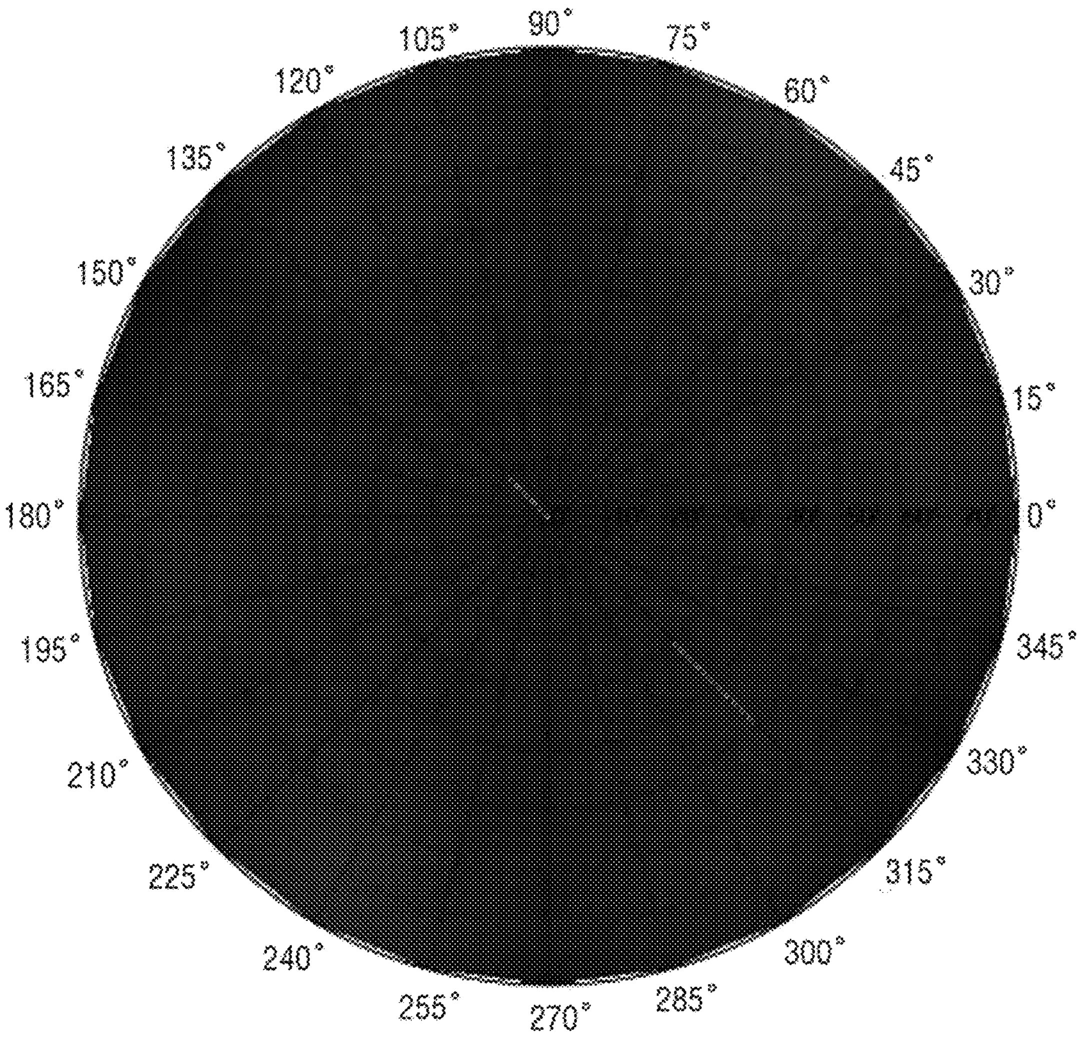
FIG. 23 shows colors of reflected light according to a viewing angle in a dark state of a display device according to an embodiment.

FIG. 16 illustrates a reflectance according to a viewing angle of the display device according to the comparative example. FIG. 17 is a graph of front reflectance (10 degree viewing angle) of the display device according to the comparative example. FIG. 18 illustrates LAB color space coordinates of reflected light according to an omnidirectional viewing angle in the display device according to the comparative example. FIG. 19 shows colors of reflected light according to a viewing angle in a dark state of the display device according to the comparative example. FIG. 20 illustrates a reflectance according to a viewing angle of a display device according to an embodiment. FIG. 21 is a graph of front reflectance (10 degree viewing angle) of a display device according to an embodiment. FIG. 22 is a diagram illustrating LAB color space coordinates of reflected light according to an omnidirectional viewing angle in the display device according to the embodiment. FIG. 23 shows colors of reflected light according to a viewing angle in a dark state of a display device according to an embodiment.

Referring to FIGS. 16 and 20, in the display device according to the comparative example, the reflectance increased in a 0 degree direction, 75 degree direction, 180 degree direction, and 255 degree direction from the front. On the other hand, in a display device according to the embodiment, the reflectance was generally low.

Referring to FIGS. 17 and 21, the display device according to the comparative example exhibited a reflectance ranging from 0.00062 to 0.00063 (a.u.) from the front (10 degree viewing angle), and a display device according to an embodiment exhibited a reflectance ranging from 0.00060 to 0.00063 (a.u.). Thus, there was no difference in the front reflectance.

Referring to FIGS. 18 and 22, the LAB color space coordinates of the reflected light according to the omnidirectional viewing angle in the display device according to the comparative example had a* values in a range of −4 to 4 and b* values in a range of −1 to 3. On the other hand, in a display device according to an embodiment, the LAB color space coordinates had a* values in a range of −1 to 4 and b* values in a range of −2 to 0. That is, it can be seen that the coordinates were shown to be relatively darker because the dispersion was narrower and closer to the center.

Referring to FIGS. 19 and 23, the color of reflected light according to the viewing angle in the dark state of the display device according to the comparative example was black from the front, but it was yellowish in the vicinity of the 0 degree direction, 75 degree direction, 180 degree direction, and 255 degree direction. On the other hand, a display device according to an embodiment showed black from the front, and also showed darker black in the 0 degree direction, 75 degree direction, 180 degree direction, and 255 degree direction.

Experimental Example 1 described above shows that a display device that includes an optical film of an embodiment, which has the first optical compensation layer, can decrease light leakage by reducing reflectance of external light from the front and side surfaces.

Fabrication Example 2: Fabrication of Display Device Samples

Sample #1 was fabricated by setting a tilt angle of the optical axis of the first optical compensation layer of the above-described embodiment to 86 degrees, and sample #2 was fabricated by setting the tilt angle of the optical axis thereof to 94 degrees.

Experimental Example 2: Measurement of Reflectance

A reflectance according to a viewing angle in each of samples #1 and #2, which were fabricated in Fabrication Example 2, was measured.

Figure 24:
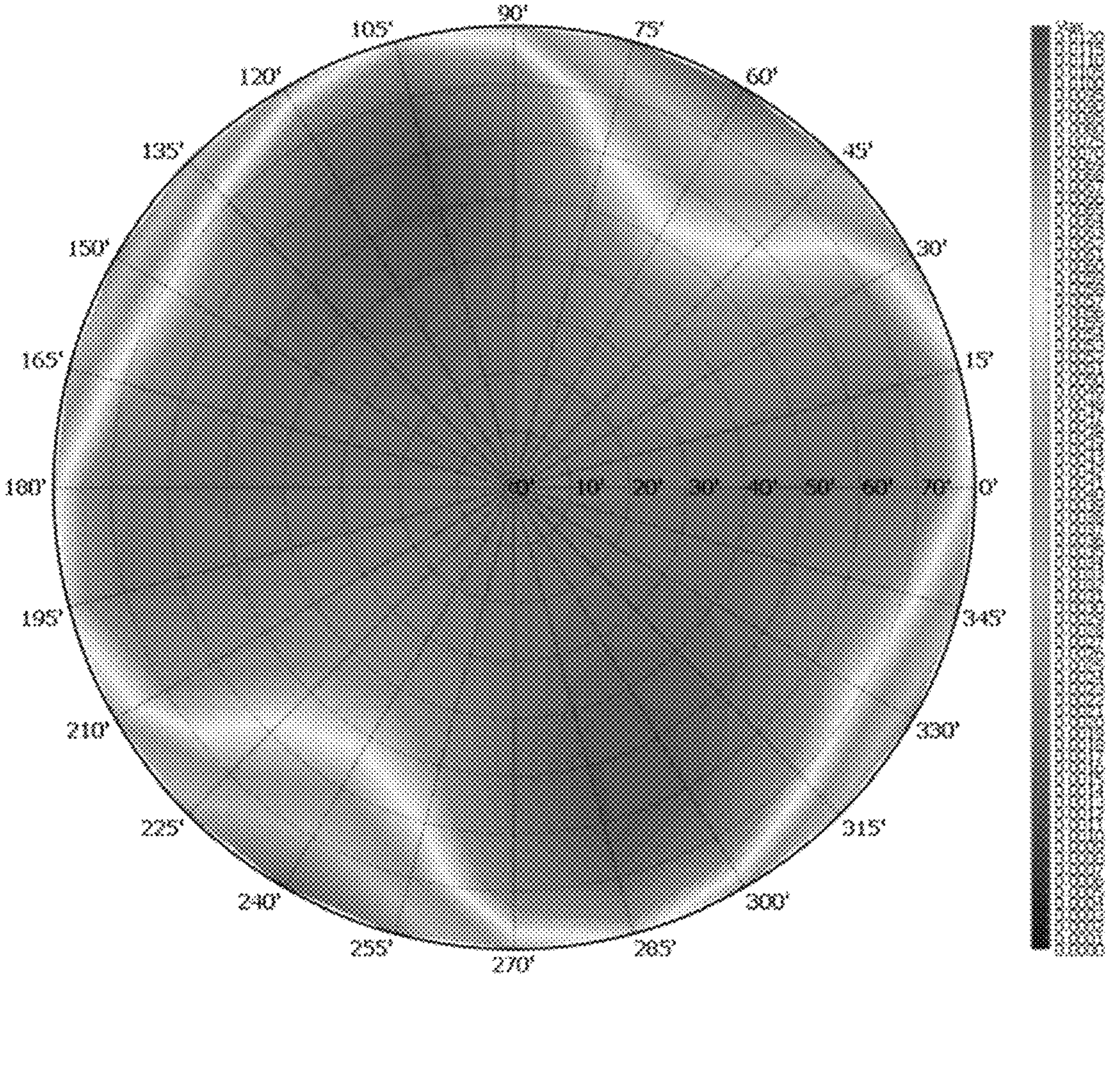
FIG. 24 shows the reflectance according to viewing angle in sample #1.
Figure 25:
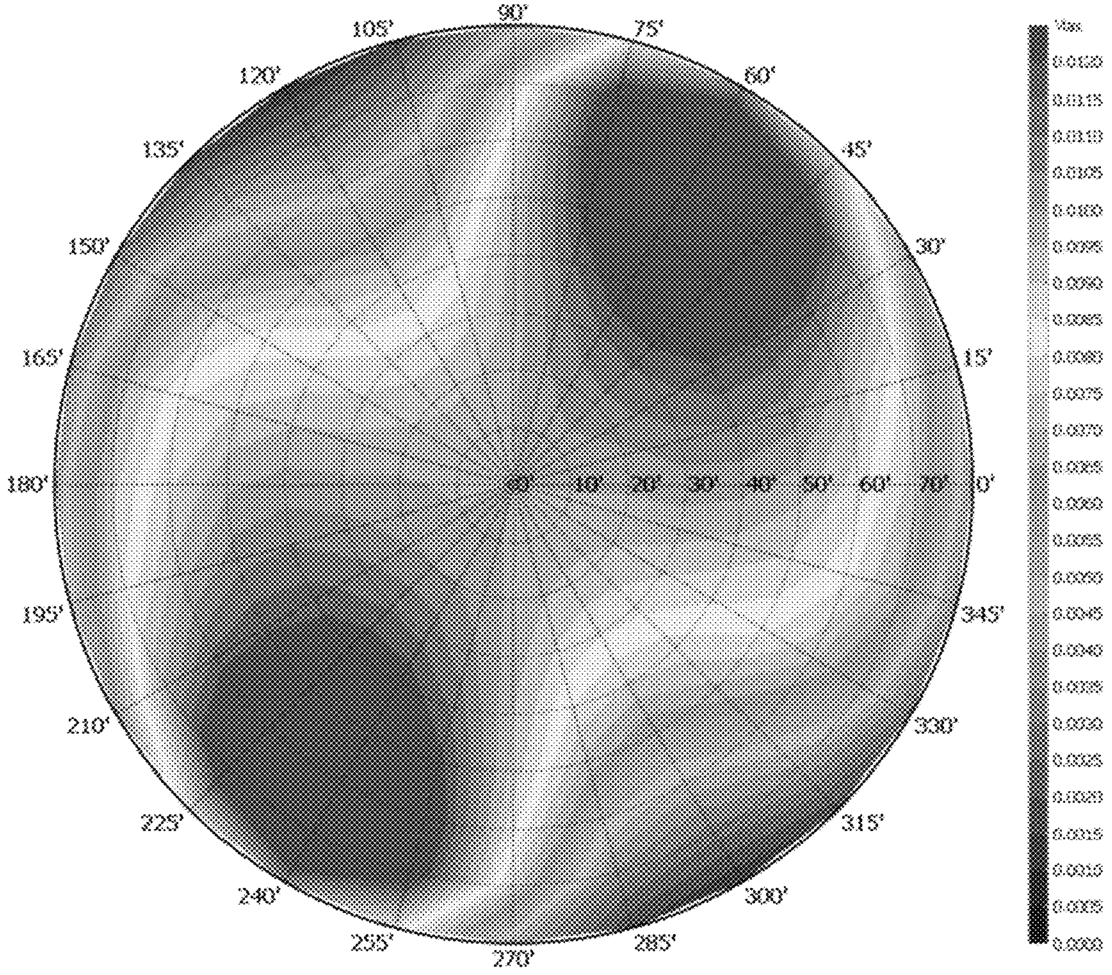
FIG. 25 shows the reflectance according to viewing angle in sample #2.

FIG. 24 shows the reflectance according to the viewing angle in sample #1. FIG. 25 shows the reflectance according to the viewing angle in sample #2.

Referring to FIGS. 24 and 25 in conjunction with FIG. 20, sample #1, in which the first optical compensation layer has an optical axis angle of 86 degrees, exhibited a reflectance of 0.832%, increasing by 1,171% compared to 0.071% of an embodiment. Sample #2, in which the first optical compensation layer has an optical axis angle of 94 degrees, exhibited a reflectance of 0.916%, increasing by 1,290% compared to an embodiment.

These results indicate that the tilt angle of the optical axis of the first optical compensation layer may be 90 degrees, and the reflectance is sufficiently improved in the range of 86 to 94 degrees.

As described above, an optical film and a display device that includes the same according to embodiments have reduced light leakage by reducing reflectance of external light when viewed from the side.

In concluding the detailed description, those skilled in the art will appreciate that many variations and modifications can be made to disclosed embodiments without substantially departing from the principles of embodiments of the present disclosure. Therefore, disclosed embodiments of the disclosure are used in a generic and descriptive sense only and not for purposes of limitation.

What is claimed is:

1. An optical film, comprising:

a polarizing layer;

a first optical compensation layer that is disposed under the polarizing layer and is a biaxial plate;

a second protective member disposed between the polarizing layer and the first optical compensation layer, wherein the second protective member is disposed directly on the first optical compensation layer;

a second optical compensation layer that is disposed under the first optical compensation layer and is a quarter wave plate;

a third optical compensation layer that is disposed under the second optical compensation layer and is a positive C plate, wherein the third optical compensation layer is closer to a display panel than the polarizing layer and is in contact with the display panel; and a second adhesive member disposed between the second optical compensation layer and the third optical compensation layer, wherein the third optical compensation layer is attached to the second optical compensation layer by the second adhesive member, wherein the first optical compensation layer has an optical axis angle of 86 to 94 degrees with respect to a transmission axis of the polarizing layer, wherein the first optical compensation layer has an in-plane retardation value (Ro) from 170 nm to 270 nm, wherein the first optical compensation layer has a refractive index ratio (Nz) from 0.5 to 2.5, and wherein the first optical compensation layer has a retardation value (Rth) from 4 nm to 84 nm in a thickness direction.

2. The optical film of claim 1, wherein the transmission axis of the polarizing layer is at 0 degrees and an optical axis of the second optical compensation layer is at 45 degrees.

3. The optical film of claim 1, further comprising a first protective member disposed on the polarizing layer.

4. The optical film of claim 1, further comprising:

a first adhesive member disposed between the first optical compensation layer and the second optical compensation layer.

5. The optical film of claim 1, wherein the second optical compensation layer is in contact with a bottom surface of the first optical compensation layer.

6. The optical film of claim 1, wherein the first optical compensation layer is in contact with a bottom surface of the polarizing layer.

7. An electronic device, comprising:

a display panel; and an optical film disposed on the display panel, wherein the optical film includes:

a foldable area, a first non-foldable area, and a second non-foldable area, wherein the foldable optical film is configured to be folded in the foldable area;

a polarizing layer;

a first optical compensation layer that is disposed under the polarizing layer and is a biaxial plate;

a second protective member disposed between the polarizing layer and the first optical compensation layer, wherein the second protective member is disposed directly on the first optical compensation layer;

a second optical compensation layer that is disposed under the first optical compensation layer and is a quarter wave plate;

a third optical compensation layer that is disposed under the second optical compensation layer and is a positive C plate, wherein the third optical compensation layer is closer to the display panel than the polarizing layer and is in contact with the display panel; and a second adhesive member disposed between the second optical compensation layer and the third optical compensation layer, wherein the third optical compensation layer is attached to the second optical compensation layer by the second adhesive member, wherein the first optical compensation layer has an optical axis angle of 86 to 94 degrees with respect to a transmission axis of the polarizing layer, wherein the first optical compensation layer has an in-plane retardation value (Ro) from 170 nm to 270 nm, wherein the first optical compensation layer has a refractive index ratio (Nz) from 0.5 to 2.5, and wherein the first optical compensation layer has a retardation value (Rth) from 4 nm to 84 nm in a thickness direction.

8. The electronic device of claim 7, further comprising:

a cover window disposed in front of the optical film;

a polymer film layer disposed behind the display panel; and a cushion layer disposed behind the polymer film layer.

9. The electronic device of claim 7, wherein the transmission axis of the polarizing layer is at 0 degrees and an optical axis of the second optical compensation layer is at 45 degrees.

10. The electronic device of claim 7, further comprising a first protective member disposed on the polarizing layer.

11. The electronic device of claim 7, further comprising:

a first adhesive member disposed between the first optical compensation layer and the second optical compensation layer.

12. The electronic device of claim 7, wherein the second optical compensation layer is in contact with a bottom surface of the first optical compensation layer.

13. An optical film, comprising:

a polarizing layer;

a first optical compensation layer that is disposed under the polarizing layer and is a biaxial plate;

a second protective member disposed between the polarizing layer and the first optical compensation layer, wherein the second protective member is disposed directly on the first optical compensation layer;

a second optical compensation layer that is disposed under the first optical compensation layer and is a quarter wave plate;

a third optical compensation layer that is disposed under the second optical compensation layer and is a positive C plate, wherein the third optical compensation layer is closer to a display panel than the polarizing layer and is in contact with the display panel; and a second adhesive member disposed between the second optical compensation layer and the third optical compensation layer, wherein the third optical compensation layer is attached to the second optical compensation layer by the second adhesive member, wherein the first optical compensation layer has an in-plane retardation value (Ro) from 170 nm to 270 nm, the first optical compensation layer has a refractive index ratio (Nz) from 0.5 to 2.5, and the first optical compensation layer has a retardation value (Rth) from 4 nm to 84 nm in a thickness direction.

* * * * *